(12) United States Patent
Nishii et al.

(10) Patent No.: US 12,193,348 B2
(45) Date of Patent: Jan. 14, 2025

(54) AREA REGISTRATION METHOD AND AREA REGISTRATION SYSTEM

(71) Applicant: Yanmar Power Technology Co., Ltd., Osaka (JP)

(72) Inventors: Yasuto Nishii, Osaka (JP); Taiki Shirafuji, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 188 days.

(21) Appl. No.: 17/800,877

(22) PCT Filed: Feb. 3, 2021

(86) PCT No.: PCT/JP2021/003973
§ 371 (c)(1),
(2) Date: Aug. 18, 2022

(87) PCT Pub. No.: WO2021/166650
PCT Pub. Date: Aug. 26, 2021

(65) Prior Publication Data
US 2023/0081284 A1 Mar. 16, 2023

(30) Foreign Application Priority Data
Feb. 19, 2020 (JP) .................. 2020-026687
Jan. 29, 2021 (JP) .................. 2021-012745

(51) Int. Cl.
*A01B 69/04* (2006.01)
*G05D 1/00* (2006.01)

(52) U.S. Cl.
CPC ......... *A01B 69/008* (2013.01); *G05D 1/0212* (2013.01)

(58) Field of Classification Search
CPC ..................... G05D 1/0212; A01B 69/008
See application file for complete search history.

(56) References Cited

U.S. PATENT DOCUMENTS

2019/0353483 A1* 11/2019 Liu .................. G05D 1/0219

FOREIGN PATENT DOCUMENTS

JP 2019204544 A * 11/2019 ........... A01B 69/008

* cited by examiner

*Primary Examiner* — Peter D Nolan
*Assistant Examiner* — Luke Huynh
(74) *Attorney, Agent, or Firm* — Chris Mizumoto

(57) ABSTRACT

An area registration method including setting information about a work vehicle that autonomously travels in a travel area; setting a work area which is included in the travel area and in which the work vehicle performs work; setting a headland area that is included in the travel area and is located on the outer side of the work area; and, when an operation for inputting the set information of the headland area is received after the work area and the headland area have been set, changing the sizes of the work area and the headland area on the basis of the inputted set information.

9 Claims, 19 Drawing Sheets

ENTRANCE

AREA REGISTRATION METHOD AND AREA REGISTRATION SYSTEM

CROSS-REFERENCE

This application is a national phase of an international application, PCT/JP2021/003973 filed on Feb. 3, 2021, which claims the benefit of Japanese Application No. 2020-026687, filed on Feb. 19, 2020 and Japanese Application No. 2021-012745, filed on Jan. 29, 2021, all of which are incorporated by reference.

TECHNICAL FIELD

The present invention relates to an area registration method and an area registration system that enable an operator, a user or the like to re-set, to change, and to register a desired headland area and the like as appropriate when generating and setting a work route and the like for an autonomously traveling work vehicle to work while traveling.

BACKGROUND ART

In order to generate the work route on which the autonomously traveling work vehicle travels, it is necessary to classify and register the headland area, which is set up as a travel area for a 180-degree change of direction or the like, a work area disposed inside the headland area and the like in advance. Regarding the method of generating a travel route as above, a method described in the Patent Literature 1 is known.

This Patent Literature 1 describes a method in which a headland area is set by determining the number of work strokes on the basis of vehicle information of the work vehicle and the like, and the work area is set in accordance with a size of the headland area. In the method of setting the headland area here, the headland area is set from the vehicle information, and the headland area is automatically set with a range that can ensure safety of the work vehicle and a width that allows the work vehicle to turn as a minimum range.

CITATION LIST

Patent Literature

Patent Literature 1 : WO2015/119263

DISCLOSURE OF INVENTION

Problems to be Solved by the Invention

However, when the size of the headland area is automatically determined in this way, the size of the work area is also automatically determined inevitably, and it was not possible to set the headland area and the work area as desired by the operator or user (hereinafter collectively referred to as the "operator").

Therefore, an object of the present invention is to provide an area registration method and an area registration system that allow the operator to re-set the desired work area or headland area as desired, that is, to review setting of a registered area by changing a size of the once-set headland area or the like to an arbitrary size.

Means for Solving the Problems

An area registration method according to the present invention is a method of executing setting information on a work vehicle that autonomously travels in a travel area, setting a work area that is included in the travel area and in which the work vehicle performs a work, setting a headland area that is included in the travel area and disposed on an outer side of the work area, and when an operation to input setting information of the headland area is accepted after the work area and the headland area have been set, changing the sizes of the work area and the headland area on the basis of the input setting information.

The area registration system according to the present invention is a system including a vehicle information setting unit that sets information on a work vehicle that autonomously travels in a travel area, a work area setting unit that sets a work area included in the travel area and in which the work vehicle performs a work, a headland area setting unit that sets a headland area included in the travel area and disposed on the outer side of the work area, and a changing unit that changes the sizes of the work area and the headland area on the basis of the input setting information, when an operation to input the setting information of the headland area is accepted after the work area and the headland area have been set.

DESCRIPTION OF EMBODIMENTS

Embodiments of the present invention will be described below with reference to the accompanying figures.

First Embodiment

Regarding an autonomously traveling work vehicle which employs an area registration system of this embodiment, a tractor is used as the autonomously traveling work vehicle 1 that is capable of unmanned and automatic travel, and explanation will be made with this autonomously traveling work vehicle 1 (hereinafter referred to as the "tractor 1" in some cases) to which a rotary cultivator as a work machine 24 is attached. However, in the present invention, the work vehicle is not limited to the tractor 1, but may be a combine harvester or the like, and the work machine is not limited to the rotary cultivator, but may be a ridging machine, a mower, a rake, a seeding machine, a fertilizing machine, a wagon or the like.

Figure 1:
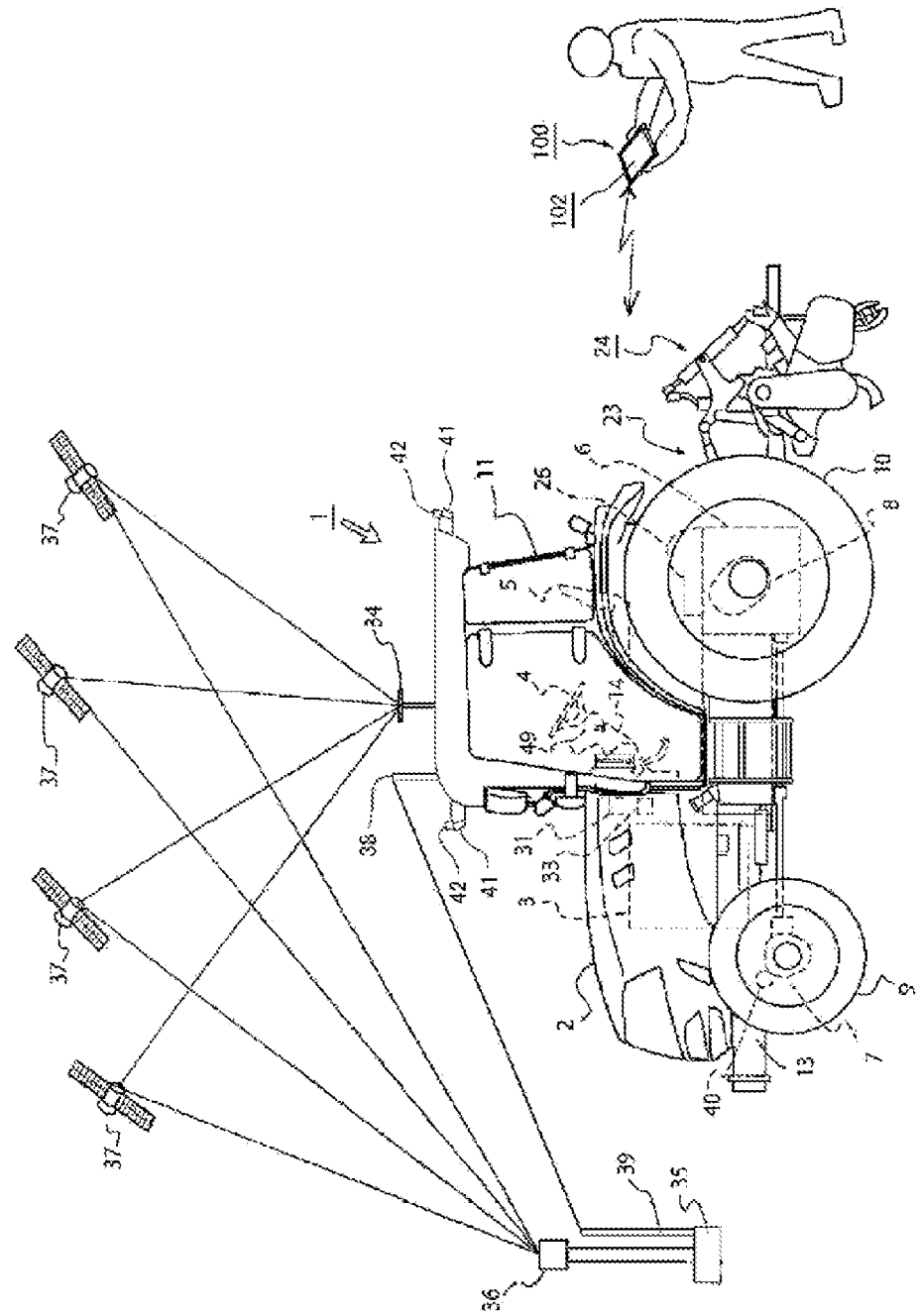
FIG. 1 is a schematic side view illustrating an autonomously traveling work vehicle, a GPS satellite, and a reference station according to a first embodiment of the present invention.
Figure 2:
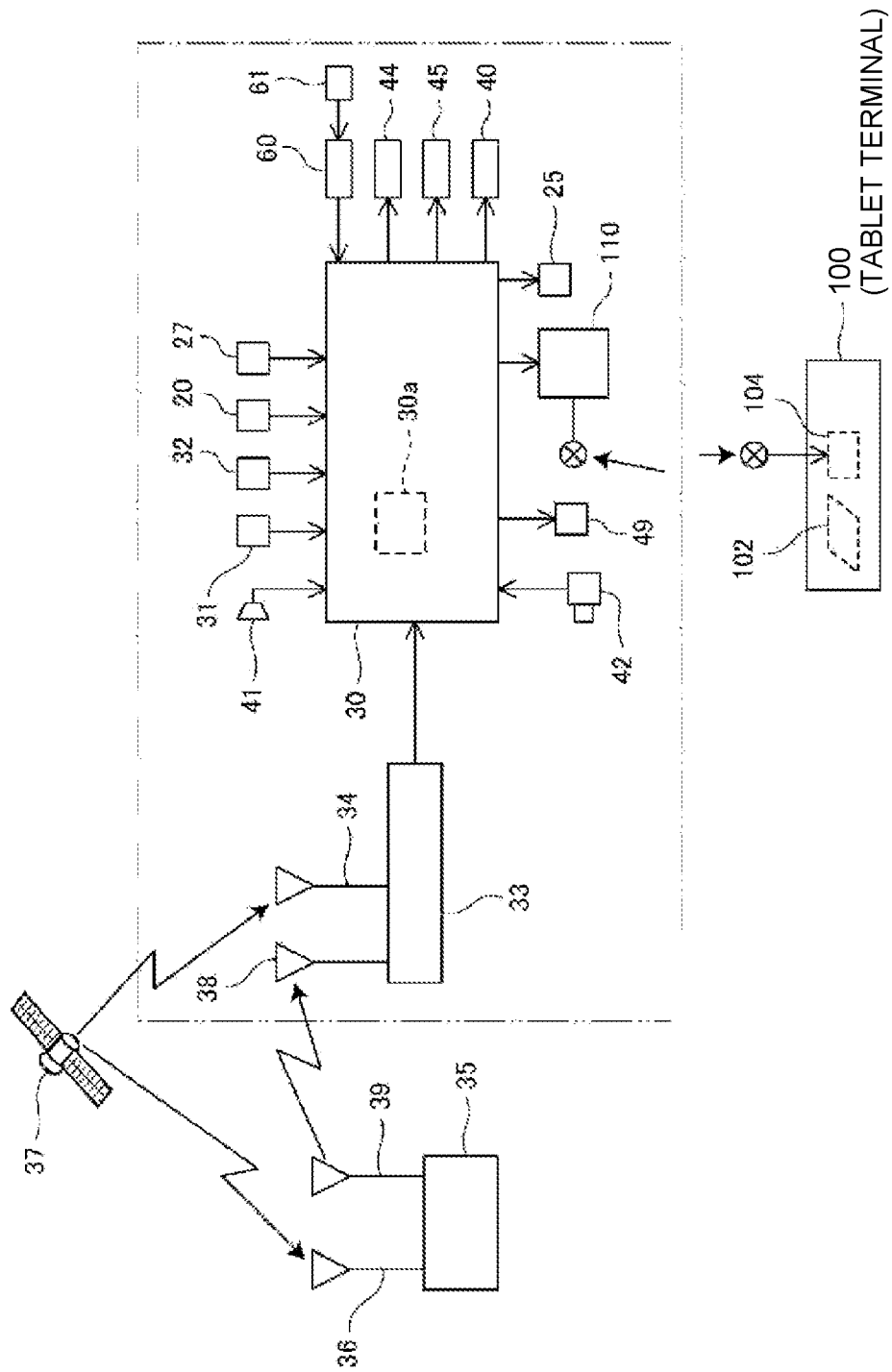
FIG. 2 is a control block diagram illustrating the autonomously traveling work vehicle, the GPS satellite, and the reference station according to the first embodiment of the present invention.

First, the overall configuration of the tractor 1 is described in FIGS. 1 and 2. In this tractor 1, an engine 3 is installed inside a hood 2, a dashboard 14 is provided inside a cabin 11 on a rear part of the hood 2, and a steering handle 4 as steering operation means is provided on the dashboard 14. A direction of a front wheel 9 is rotated through a steering device by turning the steering handle 4.

A steering direction of the tractor 1 is detected by a steering sensor 20. The steering sensor 20 is constituted by an angle sensor and is disposed at a rotation base portion of the front wheel 9. A detection value obtained by the steering sensor 20 is input to a control device 30.

A driver's seat 5 is disposed on a rear of the steering handle 4, and a transmission case 6 is disposed below the driver's seat 5. A rear axle case 8 is connected to both left and right sides of the transmission case 6, and a rear wheel 10 is supported by the rear axle case 8 via an axle. Transmission means 44 is connected to the control device 30. A rotation number of the rear wheel 10 is detected by a car speed sensor 27 and is input to the control device 30 as a traveling speed.

A PTO clutch and a PTO transmission device are accommodated in the transmission case 6. The PTO clutch is engaged/disengaged by PTO switching means 45, and the PTO switching means 45 is connected to the control device 30 and is capable of controlling engagement/disengagement of power to a PTO shaft.

A front axle case 7 is supported on a front frame 13 that supports the engine 3 and it is configured such that the front wheels 9 are supported on both sides of the front axle case 7, and the power from the transmission case 6 can be transmitted to the front wheels 9. The front wheel 9 is a steering wheel and can be rotated by turning the steering handle 4. This front wheel 9 can be steered and rotated left and right by a steering actuator 40, which is constituted by a power steering cylinder as steering drive means. The steering actuator 40 is connected to the control device 30 and is driven by automatic travel control.

To the control device 30, an engine controller 60, which serves as engine rotation control means, is connected, and to the engine controller 60, an engine rotation number sensor 61, a water temperature sensor, an oil pressure sensor and the like are connected so as to enable detection of an engine state. The engine controller 60 detects a load from a set rotation number and an actual rotation number and executes control so as not to generate overload, and also transmits a state of the engine 3 to a remote control device 100, which will be described later, so that it can be displayed on a display 102 that serves as display means.

On display means 49 provided on the dashboard of the tractor 1, a fuel gauge that displays a remaining amount of fuel and the like are provided and are connected to the control device 30. Then, information on the remaining amount of the fuel is transmitted from the control device 30 to the remote control device 100, and the remaining amount of the fuel and available work time are displayed on the display 102 of the remote control device 100. Moreover, on the dashboard 14, the display means 49 that displays an engine tachometer, a fuel gauge, monitors showing an oil pressure and the like and abnormalities, set values and the like is disposed.

Furthermore, it is configured such that the rotary cultivator 24 is mounted as a work machine, capable of elevation, for a cultivating work is attached on the rear of a machine body of the tractor 1 via a work-machine mounting device 23. An elevating cylinder 26 is provided on the transmission case 6, and by extending and retracting the elevating cylinder 26, an elevating arm constituting the work-machine mounting device 23 can be rotated so as to elevate the rotary cultivator 24. The elevating cylinder 26 is extended and retracted by an action of an elevation actuator 25, and the elevation actuator 25 is connected to the control device 30.

A mobile receiver 33, which constitutes a satellite positioning system, is connected to the control device 30. To the mobile receiver 33, a mobile GPS antenna 34 and a data receiving antenna 38 are connected. On the other hand, the mobile GPS antenna 34 and the data receiving antenna 38 are provided on the cabin 11. The mobile receiver 33 includes position calculating means so that measured latitude and longitude can be transmitted to the control device 30 and a current position can be grasped.

The tractor 1 includes a gyro sensor 31 to obtain information on an attitude change of a machine body and an azimuth sensor 32 to detect an advancing direction, which are connected to the control device 30. However, since the advancing direction can be calculated from position measurement of the GPS, the azimuth sensor 32 can be omitted.

The gyro sensor 31 detects an angular speed of inclination (pitch) in a front-back direction of the machine body, the angular speed of inclination (roll) in a left-right direction of the machine body, and the angular speed of turning (yaw) of the tractor 1. This gyro sensor 31 is connected to the control device 30 and inputs information related to the above three angular speeds to the control device 30.

The azimuth sensor 32 detects an orientation of the tractor 1 (advancing direction). This azimuth sensor 32 is connected to the control device 30 and inputs information related to an orientation of the machine body to the control device 30.

In this way, the control device 30 calculates signals acquired from the above gyro sensor 31 and azimuth sensor 32 by attitude/azimuth calculating means and acquires the attitude of the tractor 1 (that is, orientation, inclination in the front-back and left-right directions of the machine body, and the turning direction).

Method of Acquiring Position Information

Subsequently, a method of acquiring position information of the tractor 1 using GPS (Global Positioning System) will be described in brief.

Various methods can be used as a positioning method using the GPS, but an RTK-GPS positioning method, which has high measurement accuracy, is employed in this embodiment.

In this embodiment, the mobile receiver 33, the mobile GPS antenna 34 and the data receiving antenna 38, which serve as mobile stations, are disposed on the tractor 1, and a fixed receiver 35, a fixed GPS antenna 36, and a data transmission antenna 39, which serve as reference stations, are disposed at a predetermined position that does not interfere with works in a field.

The mobile GPS antenna 34 disposed on the tractor 1 receives signals from GPS satellites 37, 37 . . . . This signal is transmitted to the mobile receiver 33 for positioning. And at the same time, the fixed GPS antenna 36, which serves as a reference station, receives signals from the GPS satellites 37, 37 . . . , positions them with the fixed receiver 35, transmits them to the mobile receiver 33, and determines the position of a mobile station. The position information obtained as above is transmitted to the control device 30.

The control device 30 in the tractor 1 receives radio waves transmitted from the GPS satellites 37, 37 . . . and acquires the position information of the machine body at set time intervals with the mobile receiver 33, acquires displacement information and azimuth information of the machine body (work vehicle 1) from the gyro sensor 31 and the azimuth sensor 32, and on the basis of the position information, displacement information, and azimuth information, controls the steering actuator 40, the transmission means 44 and the like so that the machine body can travel along a travel route R set in advance.

Moreover, in the tractor 1, an obstacle sensor 41 is disposed and is connected to the control device 30 so as not to contact obstacles. For example, the obstacle sensor 41 of this embodiment is connected to the control device 30 and executes control to stop travel when an obstacle approaches within a set distance.

Moreover, in the tractor 1, a camera 42 that takes pictures of a periphery of the machine body is mounted and is connected to the control device 30. Images captured by the camera 42 are displayed on the display 102 of the remote control device 100 carried by the operator.

The camera images can be displayed at all times or selectively on the display 102 or on the display means 49 provided on the tractor 1.

The remote control device 100 registers/sets the travel route R of the tractor 1, remotely controls the tractor 1, monitors a traveling state of the tractor 1 or a working state of the work machine 24, and stores work data, details of which will be described later.

In addition, the remote control device 100 and the tractor 1 are configured capable of communicating with each other wirelessly, and in the tractor 1 and the remote control device 100, a transceiver 110 and a transceiving unit 104 for communication are provided, respectively. The transceiving unit 104 is configured integrally with the remote control device 100. Communication means is configured capable of communicating with each other via a wireless LAN, such as WiFi. When communication is conducted between the tractor 1 and the remote control device 100, measures are taken to avoid communication jamming (including virus infection and the like), interference and the like. For example, proprietary protocols and languages can be used.

Remote Control Device

Figure 3:
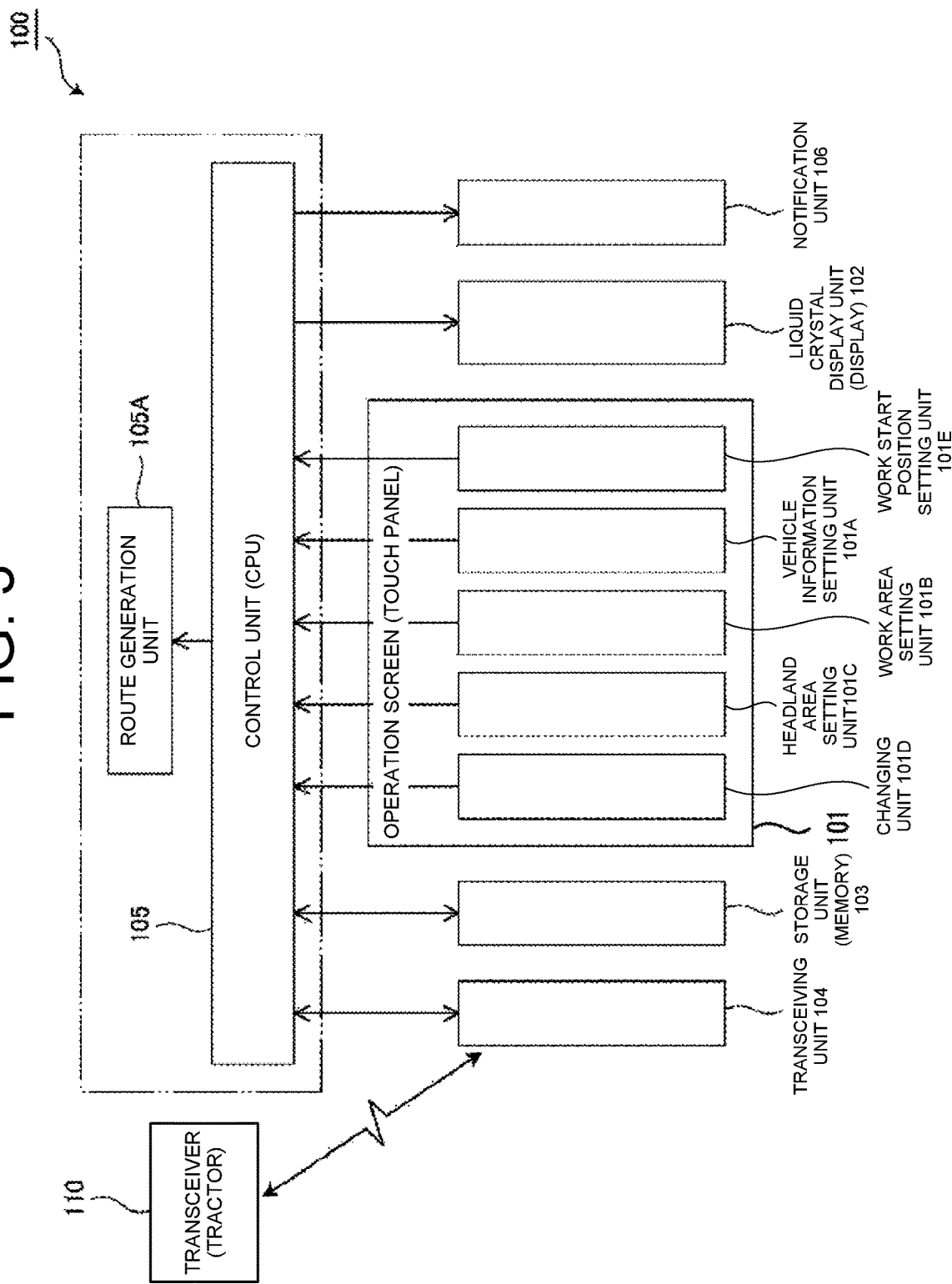
FIG. 3 is a block diagram illustrating a structure of a remote control device according to the first embodiment of the present invention.

As shown in FIG. 3, the remote control device 100 is constituted by a touch panel type operation screen (hereinafter referred to as a "touch panel" in some cases) 101 that can be operated by touching the screen with a finger or the like, a liquid crystal display unit (hereinafter referred to as a "display" or an "LCD" in some cases.) 102 that displays various switches and the like of this operation screen 101 on a liquid crystal screen, a storage unit (memory) 103 that stores/saves registration information and the like, a transceiving unit 104 that performs transmission/reception with the tractor 1, a control unit (CPU) 105 that controls the above, a route generation unit 105A that sets a travel route (or a work route R) in a work area WA, a notification unit 106, a battery, a camera and the like, not shown.

The operation screen 101 includes a vehicle information setting unit 101A for inputting and setting various types of data related to the vehicle (tractor 1 or the like) required for registration as the work area WA, a work area setting unit 101B for inputting and setting various types of data required for the registration as a work area WA of a field H (travel area) to be worked on, a headland area setting unit 101C for setting a headland area disposed on an outer side of the work area WA and excluding the work area WA in the travel area on the basis of the information of the tractor 1, a work start position setting unit 101E for setting a position where the tractor 1 should start the work, and a changing unit 101D which enables data change for the various types of data input for the registration as the work area and the like. The headland area is constituted by a first headland area that includes a turn and a second headland area that does not include a turn.

Note that, as the headland area setting unit 101C, a case where only either one of the first headland area and the second headland area is set is also included.

In addition, the display 102 is configured to display images of the surroundings and a state of the tractor 1 taken by the camera 42 on the tractor 1 side, a state of the work, information on the GPS (positioning information), a communication status between the remote control device 100 and the tractor 1 (display of good or bad, radio field intensity, and communication speed, for example), a positional relationship with the tractor 1 and the like so that the operator can monitor them.

Figure 17:
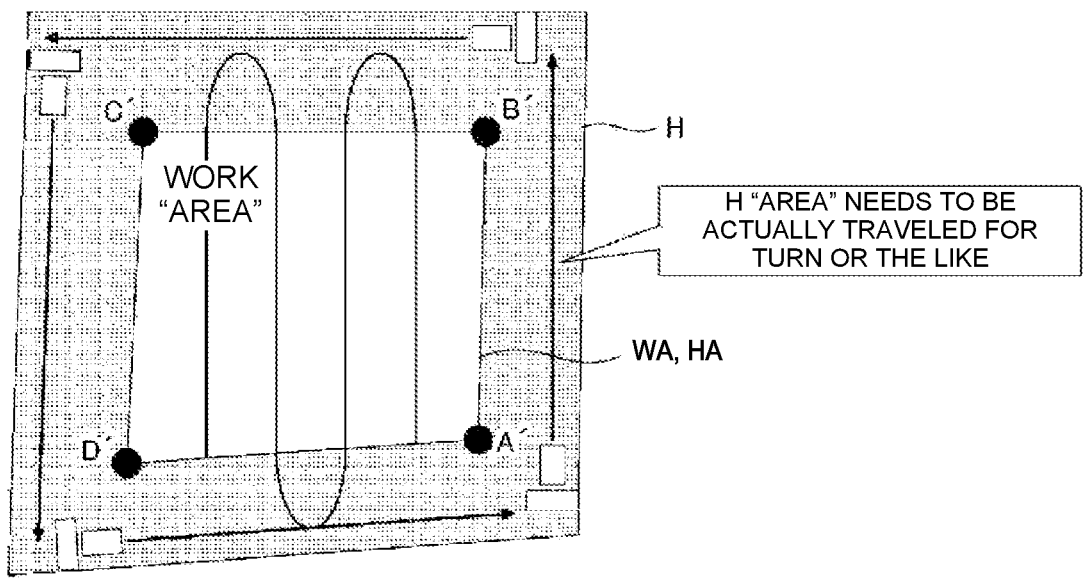
FIG. 17 is an explanatory diagram illustrating the travel route of the autonomously traveling work vehicle in the work "area" that has been set in first another embodiment of the present invention.

The route generation unit 105A sets the travel route R in the work area WA by the data calculated by the control unit 105, and the travel route R is displayed as a straight line on the screen of the display 102 as shown in FIG. 11 and FIG. 17, for example (however, it is displayed as a simplified U-shape at a turning part by the tractor 1 and the like).

The notification unit 106 notifies the operator by a buzzer sound, lighting of a lamp or display of a message that a value or a number of work strokes arbitrarily input by the operator is not accepted if the route generation unit 105A cannot set the work route or the travel route R in the work area WA regarding a value of the headland area width (headland width), the number of work strokes and the like which have been input. In addition, the notification unit 106 notifies the operator that the value of the headland area width or the number of work strokes is not accepted if the tractor 1 cannot turn in the headland area with a size corresponding to the value of the headland area width (headland width) or the number of work strokes which has been input. Therefore, it is configured such that the operator who learned that can then change the relevant data again by the changing unit 101D and have it re-registered.

Note that the data related to the work with the tractor 1 includes the work route (that is, a target route or the travel route R), a current position, a distance to the headland area calculated from the work stroke, a remaining work route, the number of work strokes and the like, and it is configured that the work route (or the travel route R) and the like can also be displayed on the display 102.

Information on the GPS (positioning information) is a longitude and a latitude as an actual position of the tractor 1, a number of supplemental satellites, radio-field reception intensity and the like.

The display 102 of the remote control device 100 can also display the state of the tractor 1, the pre-set work route (or the travel route R) and the like, in addition to the images of the surroundings taken by the camera 42.

Moreover, the tractor 1 can be remotely operated by the remote control device 100. In other words, the display 102 displays various switches and the like which can be operated by touching them with a finger for emergency stop, pause, restart of the tractor 1 and the like, as will be described in detail later. That is, the operator can remotely operate the tractor 1 easily by controlling an engine controller, an accelerator actuator, the transmission means 44, the PTO switching means 45 and the like via the transceiving unit 104, the transceiver 110, and the control device 30 from the remote control device 100.

As described above, the tractor 1 of this embodiment includes, as a general configuration, the mobile receiver 33 including position calculating means (to measure the position of the tractor 1), the steering actuator 40 to operate the steering device, the transmission means 44, the engine controller (ECU) 60 as rotation control means of the engine 3, and the control device 30 which controls them and causes the tractor 1 to travel autonomously along the travel route R (see FIG. 7 and FIG. 8) stored in the control device 30.

On the other hand, regarding the area registration system employed by the autonomously traveling work vehicle according to the present invention, registration of the various types of data required to cause the tractor 1 of this embodiment to travel autonomously in a desired field H is performed by an input device, not shown, included in the tractor 1 itself by using the touch panel 101 or the remote control device 100. As this remote control device 100, as described above, a tablet type one that can be used as a portable and handheld device is used in this embodiment.

In case of trouble with the tractor 1 or the like, the operator can operate or check the remote control device 100 near the tractor 1 or at a position where he/she can see it well, and the trouble or the like can be taken care of easily by the operator.

In addition, the remote control device 100 is constituted by a touch panel-type tablet having the display (LCD) 102. In addition, the display 102 of this remote control device 100 displays a traveling state of the tractor 1, the state of the engine 3, the state of the work machine 24, and the positional relationship with the tractor 1 and thus, the operator can easily grasp the state of the tractor 1 visually and can quickly respond to any abnormality in the tractor 1.

In addition, on the touch panel 101 which constitutes interface provided on the display 102, the vehicle information setting unit 101A which sets various information about the tractor 1, the work area setting unit 101B which sets the work area, the headland area setting unit 101C, the work start position setting unit 101E, and the changing unit 101D which enables changes of the setting information are provided. Moreover, this display 102 is configured capable of displaying a target travel route (set travel route R), the current position, the distance to the headland area, work time, the work time to completion, the work route and the like of the tractor 1, which will be described later, and that makes it easy to recognize the travel state, a progress of work and the like during the work and to draw up a work plan.

In addition, the display 102 is configured to display the GPS information (positioning information), which makes it possible to grasp the reception state from the satellite and to easily take action when the signal from the GPS satellite is lost or the like.

In addition, the tractor 1 includes the camera 42 that takes pictures of the surroundings of the machine body as described above, and it is configured such that the images taken by the camera 42 can be displayed on the display 102 and thus, a state of the surrounding of the tractor 1 can be easily recognized at a position away therefrom and can be easily dealt with in a case of an obstacle or the like.

Method of Generating Target Travel Route R in Desired Field

Subsequently, generation of the target travel route R of the tractor 1 will be described. Note that, after the target travel route is generated, it is assumed to be the travel route R that has been set and registered. Note that, the control device 30 is configured to control travel/work of the tractor 1 and to store it in a storage device 30a.

The target travel route is generated in accordance with a work mode. There are various work modes, such as a single travel work only of the tractor 1, a composite harvesting work using an autonomously traveling harvesting vehicle (combine harvester) and an accompanying transport vehicle and the like, but a method of generating a travel route for the tractor 1 including a rotary cultivator 24, which is a work machine, will be described in this embodiment.

Hereinafter, the method of generating a travel route for an automatic work system in which various cultivating works and the like are performed while the autonomous travel is performed by the tractor 1 will be described. In addition, a route generation work and a setting operation in accordance with the generation method are configured to be performed by the route generation unit 105A of the remote control device 100, but it is assumed that they can be performed also by the display means 49 of the tractor 1.

Note that it is configured such that, regarding inputs and selection of set values on the display 102 of the remote control device 100, setting screens are displayed sequentially on the display 102 in principle, as shown below, and they are performed in accordance with a procedure stored in a ROM of the storage unit 103 and the like so that an error or omission of setting does not occur and thus, it can be easily operated by the operator, and settings and inputs can be made reliably and without omissions as shown below.

1. Registration of Field Outline

First, as shown in FIGS. 5 to 8, for example, in order to set the position of the field H, a work range, and the travel route R to be worked on, the tractor 1 is positioned at four corners of the field H (A, B, C, D, or inflection points), and a stroke for positioning is performed.

The tractor 1 is advanced into the field from an entrance E and is moved to one corner (corner) A closest to the entrance. Then, the autonomously traveling work vehicle 1 is positioned so as to be parallel to a short side or a long side in the field outline, and a position thereof is determined and stored as first corner data (latitude and longitude).

Subsequently, the tractor 1 is moved to the next corner B, a direction thereof is changed by approximately 90 degrees so as to be parallel to the field outline, and the position thereof is determined and stored as second corner data. Then, in the same way, it is moved to the next corner C so as to acquire and store the third corner data and is moved to the next corner D so as to acquire and store the fourth corner data.

In this way, by connecting the corners (B, C, and D) with straight lines unicursally from one corner A, a shape of the field is finalized and acquired as field data. However, if the shape of the field is a deformed (odd-shaped) field, the field data is finalized by acquiring data for corner positions other than the four corners and inflection point positions. For example, position data of three corners in a case of a triangle and of five corners in a case of a pentagon are acquired and stored.

Note that, regarding acquisition of the data, procedures and conditions (protocols) as follows can be used as an example for execution/acquisition.

i) Since the corner part of the field H is a subordinate concept, and the inflection point is a superordinate concept, the field data can be acquired by sequentially positioning the inflection points so as to acquire position data and to go round.

ii) Also, the travel route R can be generated only in an area inside a field outer perimeter data acquired by traveling around an outermost perimeter, and it is so configured that, in a case of going out thereof, it is an error, and the travel route R cannot be generated.

iii) In addition, when corner data is connected with straight lines, if the straight lines cross each other, it is configured not to be recognized as the field data. This is because it is highly possible that a corner or inflection point is missing.

iv) In addition, in the generation of field data, obtainment of the field data from the Internet or map data published by map manufacturers and the like is prohibited, and employment of only the position data positioned at the site as described above is allowed.

In this way, going out of the field due to errors in travel during an actual work is prevented.

Moreover, there are such cases that water intakes and drains are provided, stakes, stones and the like indicating boundaries are disposed, and trees intrude and grow around the field, for example. These will get in the way when traveling linearly. Thus, it is configured such that the field outline is registered by avoiding the obstacles.

2. Setting of Work Start Position and End Positions

In addition, it is so configured that a work start position and an end position can be set or selected in the field data.

In other words, the work start position and the work end position can be set to positions preferred by the operator by the work start position setting unit 101E provided in the remote control device 100.

3. Selection of Reference Travel Start Direction

This is a process of selecting a reference travel start direction.

Figure 6:
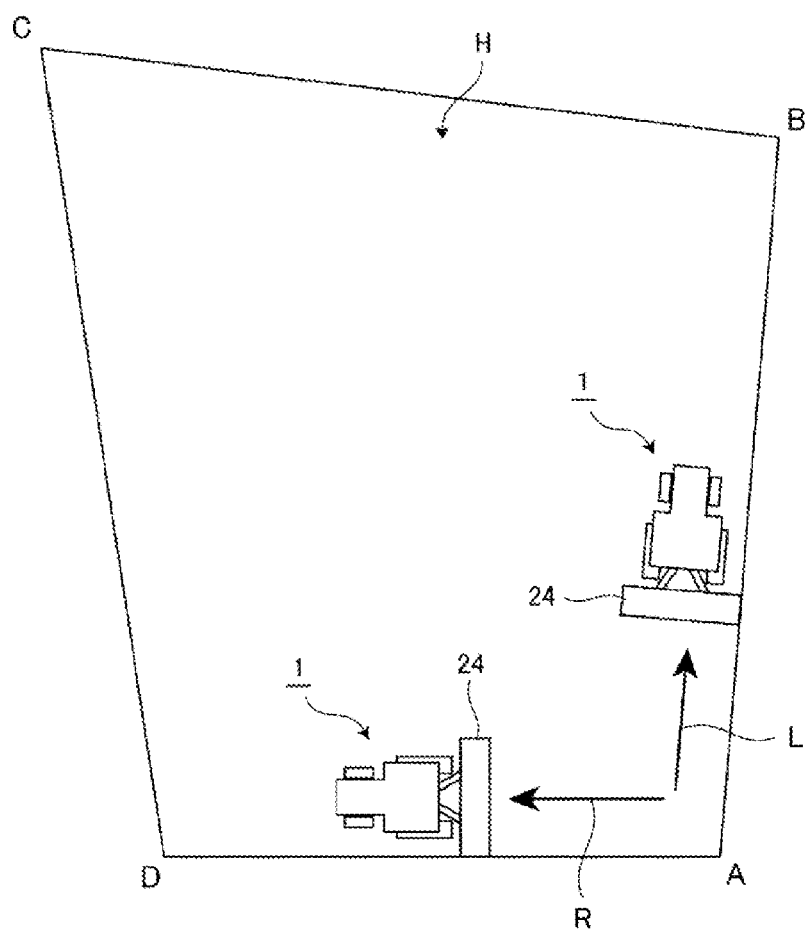
FIG. 6 is an explanatory diagram illustrating a direction in which a reference route can travel.

As the reference travel start direction, an advancing direction from the work start position X to the work end position for a turning work or a reciprocating work, or a route (work direction on the outer side of a work "area" HA) from the work end position to the exit is selected. Specifically, as shown in FIG. 6, regarding the reference travel start direction, it is set whether to start and end a work in the right-hand turning direction R or in the left-hand turning direction L. This setting can be easily selected by causing arrows, landmarks and the like to be displayed on the display 102 and touching them or the like.

4. Setting of Headland Area Width and Work Area

A subsequent process is to set the headland area width and the work area.

Figure 4:
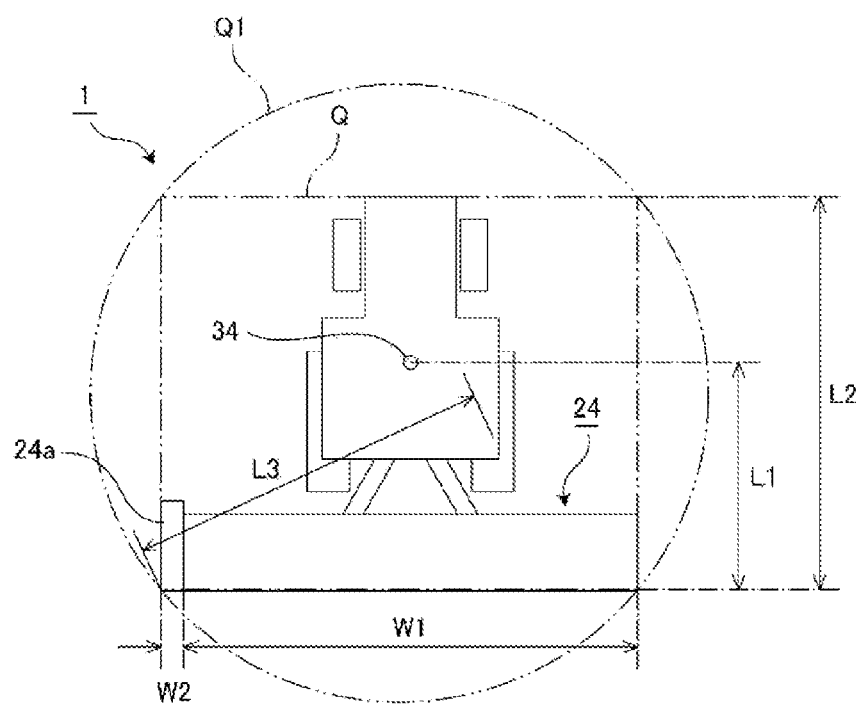
FIG. 4 is an explanatory diagram illustrating a length and other specifications of each portion to be a reference of the autonomously traveling work vehicle according to the first embodiment of the present invention.
Figure 5:
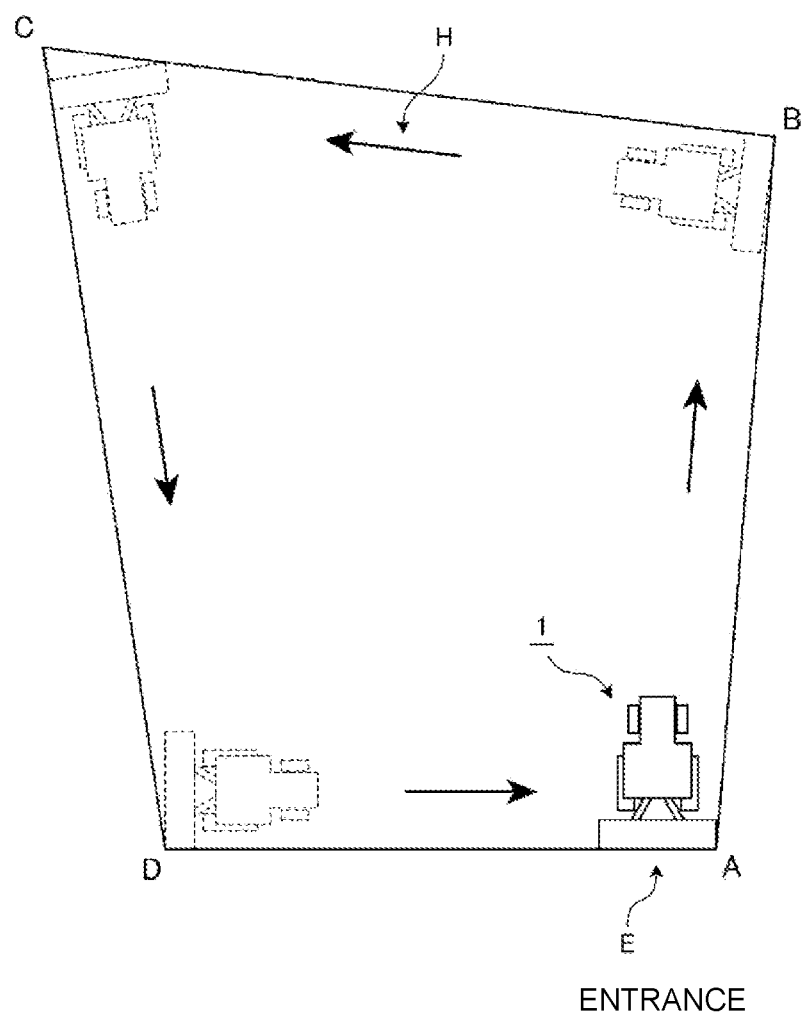
FIG. 5 is an explanatory diagram illustrating a stroke for obtaining field data.
Figure 7:
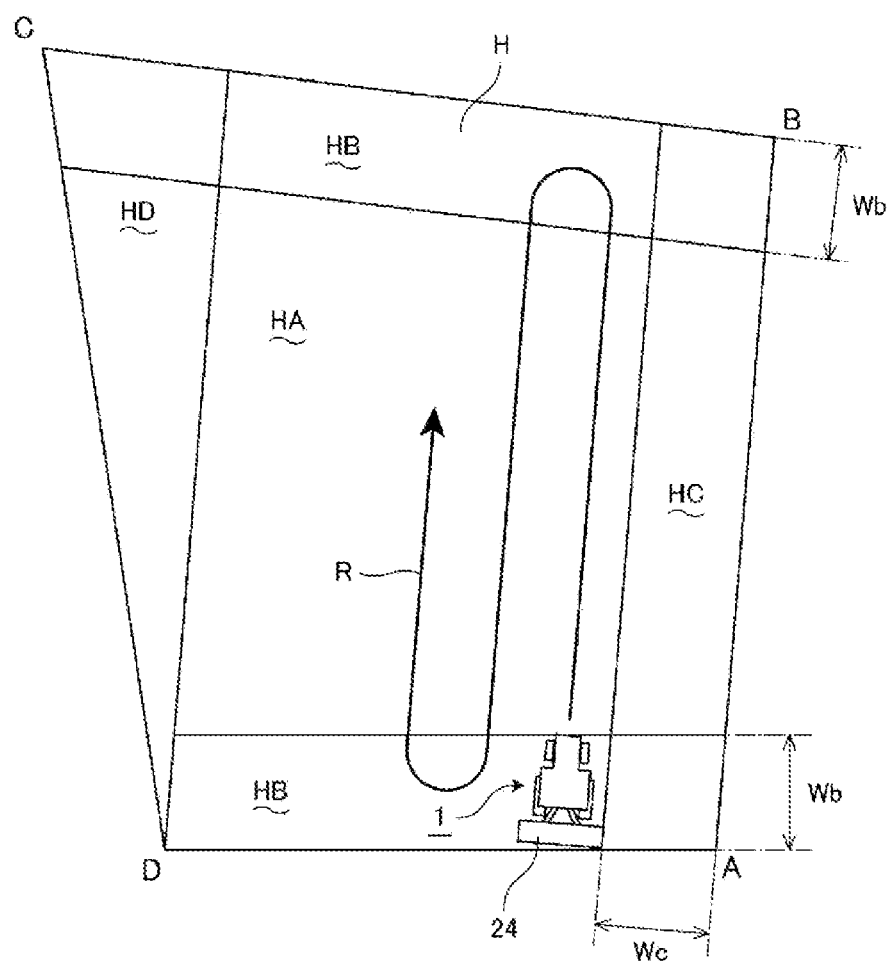
FIG. 7 is an explanatory diagram illustrating a work range, a headland and a travel route in the field.
Figure 8:
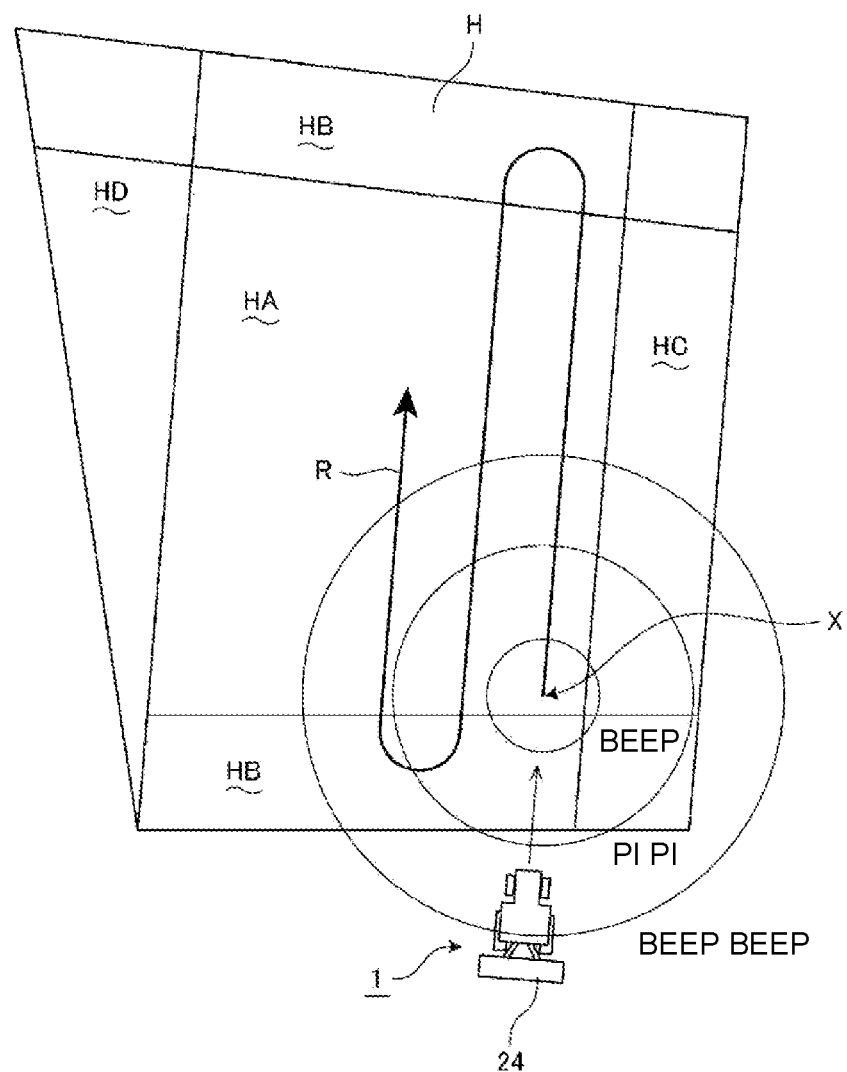
FIG. 8 is an explanatory diagram illustrating a state where the autonomously traveling work vehicle approaches a work start position according to the first embodiment of the present invention.

As shown in FIG. 7, a width Wb of a first headland area HB (hereinafter referred to as a "first headland area width Wb") is acquired from a cultivating width W1 (see FIG. 4) and the like, assuming that the work machine is the rotary cultivator 24, for example. Specifically, the cultivating width W1+a width W2 of a chain case 24a (=work width W), for example, is input and set by a value obtained by multiplying the work width W by the number of going-round strokes n. However, the first headland area width Wb is supposed to have a length in the direction parallel to the advancing direction (longitudinal direction) in which the tractor 1 works in the work "area" HA. Note that the first headland area width Wb shown in FIG. 7 should be larger than a minimum turning radius because it is necessary to make a turn with a margin in a case of turning without turning back the steering handle back and forth, for example.

Thus, the minimum turning radius of the autonomously traveling work vehicle (tractor 1) with the work machine (rotary cultivator 24 in this embodiment) attached is stored in the storage device 30a in advance so that values smaller than this minimum turning radius cannot be input during setting.

It is configured such that, once the first headland area width Wb is determined, a size of the work area is automatically set. Thus, as shown in FIG. 7, the work "area" HA acquired from the field data is made to be a substantial square, and this work "area" HA is displayed on the display 102 of the remote control device 100. In this work "area" HA, the first headland area HB is further set on both sides of the front and rear of the work direction in which the tractor 1 advances.

When another work machine is attached, an entire length of the work machine, a width of a strip and the like are taken into account and thus, it is configured such that an arbitrary length can be input in numerical values for the first headland area width Wb. There are cases where the work is performed while reciprocating in the headland area or the work is finished after spirally going around the work range including the headland area and thus, it is configured such that a turning direction in the first headland area HB can also be set.

As another embodiment, the size (width) of the headland area may be set after the work area has been set. For example, the work area setting unit 101B sets the work area on the basis of a travel locus on which the operator cause the tractor 1 to travel, and the headland area setting unit 101C sets the headland area on the basis of the set work area. Details of this embodiment will be explained in the <First Another Embodiment> below.

5. Setting of Target Travel Route R

The aforementioned numerical values and options are input and set using various buttons on the touch panel 101 that constitutes the interface provided in the remote control device 100. Then, the route generation unit 105A provided in the remote control device 100 (also may be performed by the control device 30 on the tractor 1 side) automatically generates the travel route R so that the tractor 1, which is capable of autonomous travel, can sequentially perform a reciprocating straight-traveling work in the work "area" HA and a reversing turn in the first headland area HB.

6. Setting of Work Condition

After the process of generating the travel route R, a next step is a process of setting work conditions, but the detailed explanation thereof is omitted here.

7. The Operator Drives the Tractor 1 to Move to the Work Start Position X

Lastly, when the aforementioned settings are finished and the travel route R and the work process along this travel route R are generated, the operator actually drives the tractor 1 so as to move to the work start position X in order to start the work. The operator then operates the remote control device 100 so as to start the work.

In order to start the work, start conditions of the tractor 1 should be met. These work start conditions are stored in the control device 30 of the tractor 1, and when work starting means, not shown, of the remote control device 100 is turned on, the control device 30 determines whether the predetermined work start conditions are satisfied. The work starting means in this embodiment is constituted by a start button, a start switch and the like on the remote control device 100, but this start button, the start switch and the like may be provided on the tractor 1.

Note that, regarding the setting and registering work of the travel route R in a desired field described above, it may be so configured that the registering work of the specific travel route R is performed by causing the tractor 1 to travel from one end (work start position X) to the other end (work end position) of the field H after the registration of the area by the area registration system of the present invention, which will be described later, is completed.

Area Registration Method

Subsequently, the area registration system according to this embodiment will be explained in detail with reference to FIGS. 9 to 13. Note that the present invention may also be an invention of an area registration method in which the remote control device 100 executes a part or all of area registration processing, or an invention of an area registration program for causing the remote control device 100 to execute a part or all of the area registration method. Moreover, a computer (one or a plurality of processors, for example) may also execute the aforementioned area registration processing. For example, the area registration method of the present invention is a method of executing setting information on a work vehicle that autonomously travels in a travel area, setting a work area that is included in the travel area and in which the work vehicle performs a work, setting a headland area that is included in the travel area and disposed on an outer side of the work area, and when an operation to input setting information of the headland area is accepted after the work area and the headland area have been set, changing sizes of the work area and the headland area on the basis of the input setting information.

First Example

In the area registration system of the present invention shown in FIG. 9 (hereinafter referred to as a "first example" in some cases), the operation screen 101 that displays (which is the interface) a menu for area registration on the display 102 of the remote control device 100 (see FIGS. 1 to 3) is constituted by a touch panel.

On this operation screen (hereinafter referred to as the "touch panel 101" in some cases), a part of the desired field H is displayed on a left half, and selection switches S1 to S4, which are activated by a touch operation with a finger or the like are displayed/formed on a right half. In addition, on a lower part of this operation screen 101, two switching buttons B1, B2 are displayed/formed for selecting either one of an input of the number of work strokes (stroke-number input mode) and an input of headland width specification (numerical-value input mode) and for switching/operating either one of the modes for data input, and to the right thereof, a forward tab T1 and a backward tab T2 are displayed/formed to shift a menu page to the previous or next page.

The selection switch S1 can allow selection by an operation of touching it or the like (this is referred to as a "first mode"). Registration contents which are set when this first mode was selected are, first, to specify the headland widths of the first headland area and the second headland area to minimum values, whereby an area in the field excluding the headland area is set and registered as the work area.

At this time, the cultivating width W1 (see FIG. 4) is uniquely determined on the basis of information on the models of the work vehicle 1 and the work machine (the rotary cultivator 24 in this embodiment) that have been registered in advance, and the number of work strokes in the work area WA to be cultivated by the work vehicle 1 is also automatically calculated and set and registered from a size of the registered work area WA.

The selection switch S2 can also allow selection by an operation of touching it with a finger or the like (this is referred to as a "second mode"). The registration contents which are set when this second mode was selected are to specify that the headland widths of the first headland area and the second headland area are set to multiples of the work width W. Here, a side-drive type is used for the rotary cultivator 24, which is the work machine, and the work width W at this time is defined as the sum of the cultivation width W1 and the width W2 of the chain case 24a. Moreover, an area in the field excluding the headland area is set and registered as the work area WA.

Note that, assuming that the field H has a laterally long rectangular shape, here, the cultivating work is performed while the work vehicle 1 reciprocates in a vertical direction. By the way, the headland width at this time depends on the shape of the field, but in general, a width in the headland, which is a side margin on both left and right end sides (that is, the headland width), and a width in the first headland area on both upper and lower end sides (that is, the first headland width Wb) are different in many cases, but the both widths are multiples of cultivating width described below, and these two types of headland widths are registered as the headland widths in this second mode, respectively.

Note that, similarly to the case of the selection switch S1, since the cultivating width W1 (see FIG. 4) is uniquely determined on the basis of the information on the models of the work vehicle 1 and the work machine (rotary cultivator 24 in this embodiment) that has been registered in advance, the number of reciprocating work strokes in the work area WA to be cultivated by the work vehicle 1 is also automatically calculated and set and registered from the registered width of the work area WA and the work width W.

The selection switch S3 can also allow selection by an operation of touching it with a finger or the like (this is called a "third mode"). The registration contents which are set when this third mode was selected are, similarly to the case of the second mode, the first headland area and the second headland area are set with widths of multiples of the work width W, and an area excluding the second headland area (HC) and the first headland area (HB) in the field are set and registered as the work area WA.

Here again, assuming that the field H has a laterally long rectangular shape, the cultivating work is performed while the work vehicle 1 reciprocates in the vertical direction, and the headland width at this time depends on the shape of the field, but in general, a headland width in the second headland area, which is the side margin on the both left and right end sides and the headland width Wb in the first headland area on the both upper and lower end sides are different in some cases (both are multiples of the cultivating width described below) and thus, a least common multiple (LCM) of these two types of headland widths is registered as the set width in this third mode.

Note that, in this third mode, too, similarly to the case of the first and second modes, since the cultivating width W1 (see FIG. 4) is uniquely determined on the basis of the information on the models of the tractor 1, which is the work vehicle, and the work machine (rotary cultivator 24 in this embodiment) that has been registered in advance, the number of reciprocating work strokes in the work area WA to be cultivated by the work vehicle 1 is also automatically calculated and set and registered from the registered size of the work area WA.

The selection switch S4 can also allow free setting and registration of an area width by an operation of touching it with a finger or the like (this is called a "fourth mode") and functions as an operation unit (interface) of the changing unit 101D shown in FIG. 3. In this way, the registration contents which are set when the fourth mode was selected are different from those in the first to third modes, and the headland widths of the first headland area and the second headland area, the number of work strokes and the like can be set and registered by the operator or the like by optionally, that is, by arbitrarily inputting numerical values. However, there is certain limitation to the sizes of the headland widths of the first headland area and the second headland area, and they cannot be set to be too narrow unlimitedly. Similarly, there is limitation on the number of work strokes such as a maximum of 50 strokes, for example.

Specifically, the width (headland width) of each of the first headland area and the second headland area can be set and registered arbitrarily by the operator. Moreover, in setting of the headland width, setting can be made by inputting the number of work strokes or by inputting a numerical value for the width. Furthermore, the value of the input number of work strokes can be calculated as the value of the headland width, and vice versa, the value of the headland width can be calculated as the value of the input number of work strokes.

Specific Procedure for Area Setting and Registration

Subsequently, the area registration system according to the first embodiment of the present invention will be explained mainly with reference to FIGS. 9 to 11. However, it is assumed that the following items have already been registered in advance, as explained in the method of generating the target travel route R in the desired field. Note that, for convenience of explanation, the input of the number of work strokes and the input of the numerical value of the headland width are described as if they are executed in order, but setting can be made either by the input of the number of work strokes and the input of the numerical value of the headland width. Moreover, by touching the switching buttons B1 and B2 in FIG. 9, the values set by the number of work strokes and the numerical value of the headland width can be checked.

(1) In this embodiment, information on the field H to be cultivated (a size, a shape and the like, for example) is supposed to be already registered by the work area setting unit 101B of the remote control device 100 by actual travel of the tractor 1 or the like.

(2) Moreover, as the work vehicle, the tractor 1 uses the rotary cultivator 24 as the work machine, and the cultivating width W1 and the width W2 (see FIG. 4) of the chain case 24a are uniquely determined from the specifications of the tractor 1 and the rotary cultivator 24. Therefore, the work width W (=W1+W2) has also already been determined.

Thus, in the vehicle information setting unit 101A of the tablet-type remote control device 100, it is assumed that the information (such as the work width W and the minimum turning radius of the tractor 1) is already stored (registered) in the storage unit 103 via the control unit 105.

(3) It is assumed that the work start position X (see FIG. 8) of the travel route R has also already been determined and stored in the storage unit 103 by the work start position setting unit 101E of the remote control device 100. Note that this work start position X can also be arbitrarily changed through the control unit 105 (with certain area constraints, though) by an operation by the work start position setting unit 101E via the changing unit 101D.

The target travel route R is generated in the work area, and the work area is determined by the size of the headland area. Conventionally, the size of the headland area was automatically determined by the minimum values of the work width and the number of work strokes by selecting the first mode to the third mode described above. As described above, the work area is automatically determined by the size of the headland area, which causes a limitation that the size of the work area cannot be changed and thus, the work start position (see FIG. 8) and the end position can be changed, but the work start position desired by the operator could not be set more flexibly. Thus, by allowing the operator to arbitrarily set the size of the headland area, setting of the work start position desired by the operator is realized.

Figure 9:
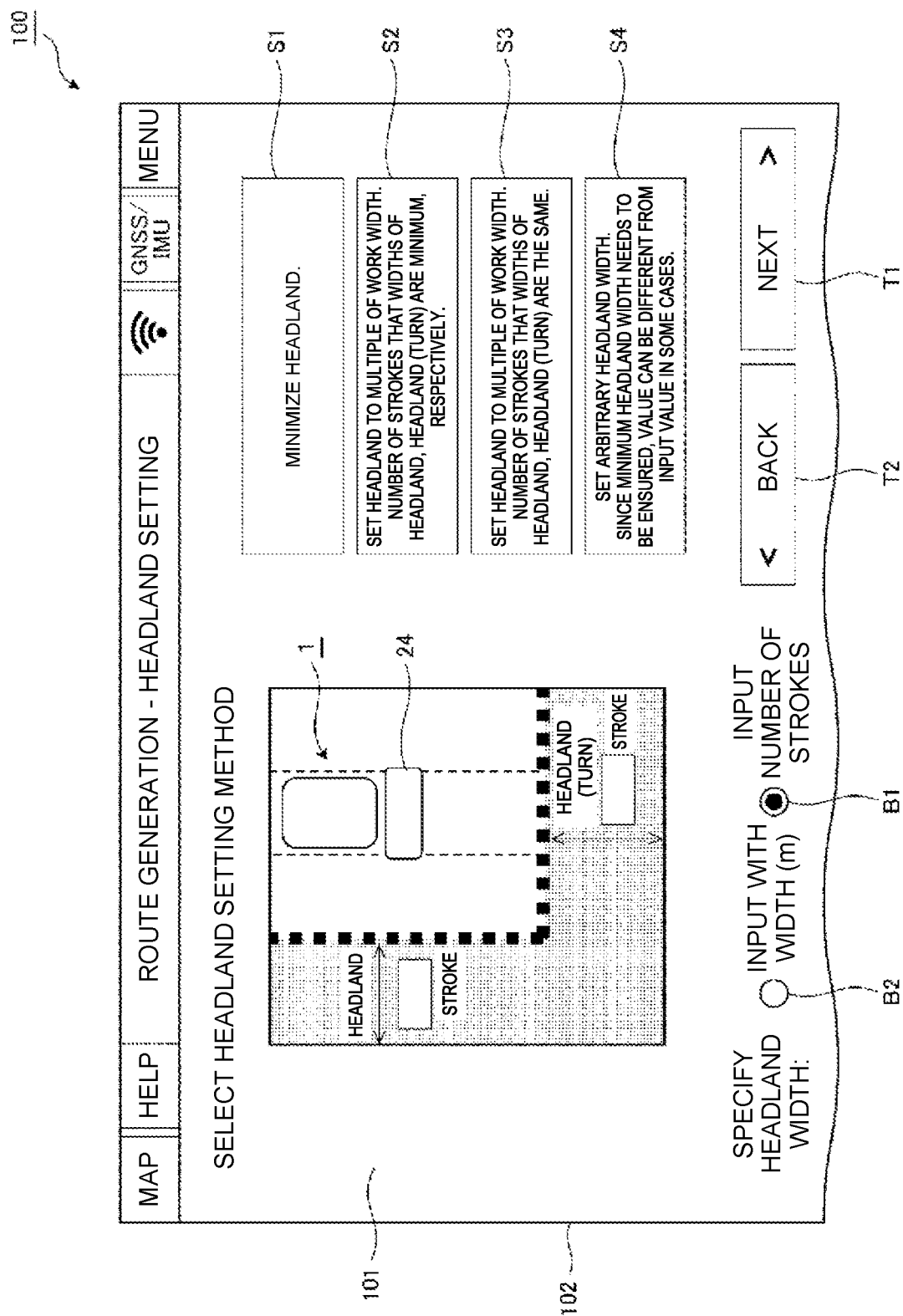
FIG. 9 is an explanatory diagram illustrating an operation screen at a changing work of a headland width and the like in a changing unit according to the first embodiment of the present invention.
Figure 10:
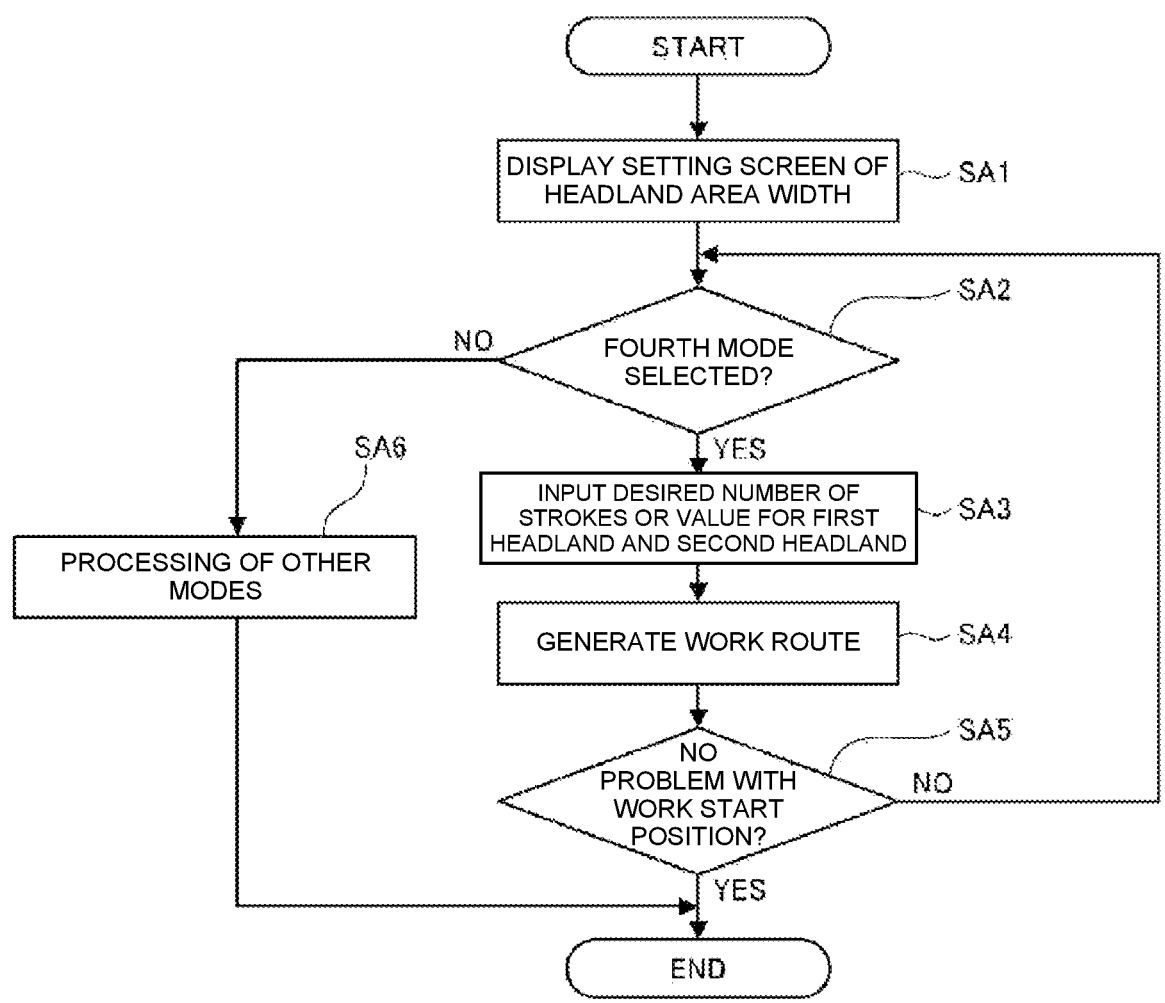
FIG. 10 is a flowchart of a first example illustrating an operation example at the changing work of the headland width and the like in the changing unit according to the first embodiment of the present invention.

FIG. 10 is a flowchart of the first example illustrating an operation example at a changing work of the headland width and the like in the changing unit 101D according to the first embodiment of the present invention. First, a menu page for the headland width to be specified, that is, the touch panel screen on which buttons and switches for input are displayed on the display 102 as shown in FIG. 9 is displayed (first Step SA1).

Then, on this screen, it is determined whether or not the operator selects the selection switch S4 (second Step SA2).

Then, when the operator selects this selection switch S4, he/she operates this selection switch S4 so as to set the fourth mode. That is, the operator touches the selection switch S4 with a finger or the like and also touches the switching button B1, for example, to make a selection. As a result, such a state is brought about that the number of strokes in the first headland area and the second headland area can be input on the screen, respectively (third Step SA3).

Subsequently, the operator numerically inputs the desired number of work strokes or the numerical values of the headland widths for the second headland area and the first headland area. For example, here, the operator specifies and inputs the number of work strokes in the first headland area as 2 and the number of work strokes in the second headland area as 4. After setting the values for the first headland area and the second headland area as above, by operating the forward tab T1 in FIG. 9, the screen shifts to a work setting screen where the vehicle speed during the work and the vehicle speed at a turn are set. Then, after final confirmation of setting items, the target travel route R is generated (fourth Step SA4).

Note that the operator can switch to an input menu of a numerical value (m) of the headland width by touching the switching button B2, for example, in this input menu of the number of work strokes, and settings and changes can be also made by numerical values. In addition, if the work width W is 2 m and the first headland area width is 4.5 m, for example, the number of work strokes is 4.5 (m)/2 (m)=2.25 (strokes), which is not an integer. In such a case, the number of work strokes in the headland area is displayed as 3, since the number of work strokes is rounded up to 3. Note that the calculation work up to this point is performed by the control unit 105 of the remote control device 100 on the basis of various types of data in the storage unit 103, and the numerical values obtained from the calculation are displayed on the screen.

Figure 11A:
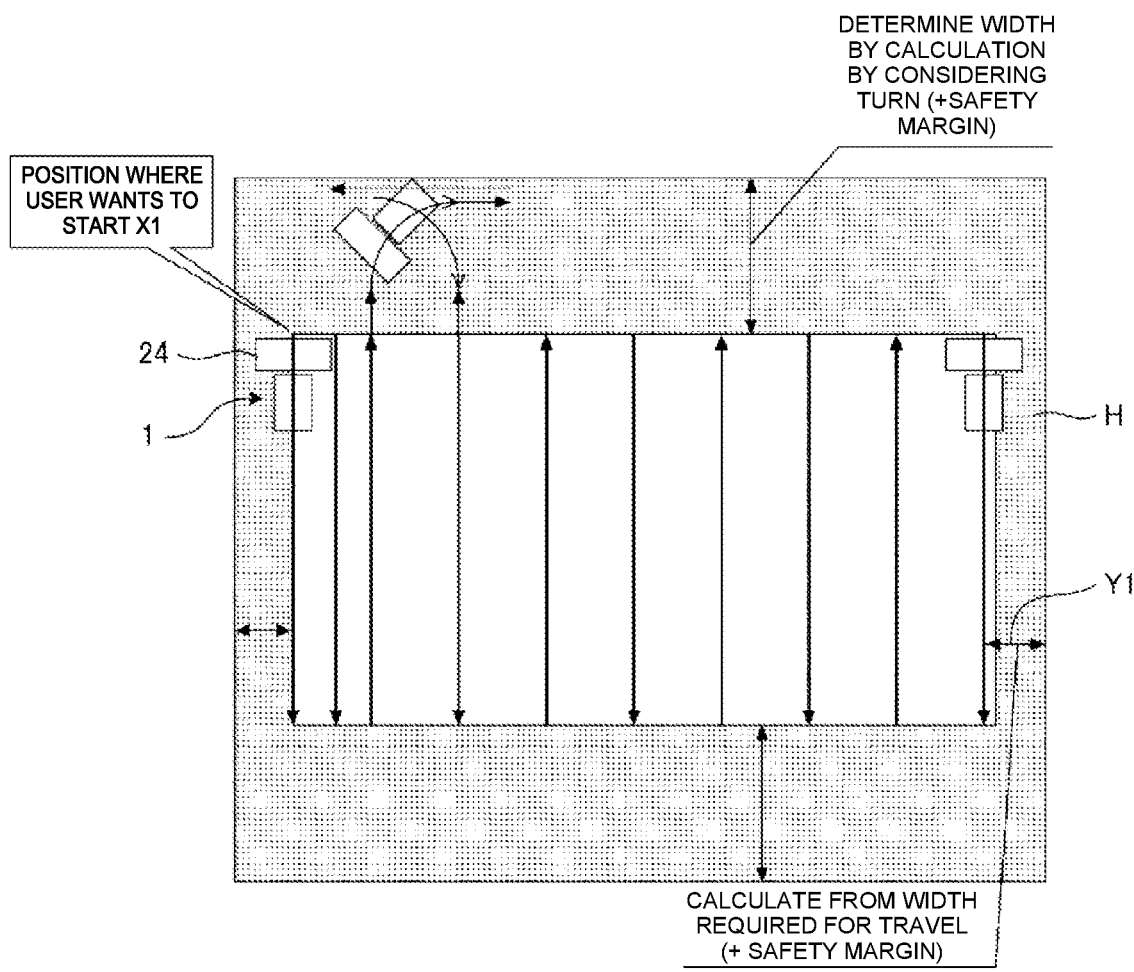
FIG. 11A is an explanatory diagram illustrating ineligibility of the set travel route in conventional automatic setting of a headland width.

Moreover, when the work route R is generated, the operator can check whether there is any problem (inconvenience) in the work start position X or the work end position by an appropriate operation such as touching the forward tab T1, for example, to switch the screen and causes the work route R to be displayed on the display 102 of the remote control device (tablet) 100. Then, the operator determines whether there is any problem with the work start position X or the like of the displayed work route R (fifth Step SA5). For example, by superimposing and displaying the tractor 1 and the work route R as shown in FIG. 11A, the operator himself/herself can check whether there is any problem with the work start position X1 and the work end position.

And if it is determined that there is no problem with the work start position X or the work end position or the like, assuming that the generation work of the work route R is finished, a series of works up to this point is finished.

Figure 11B:
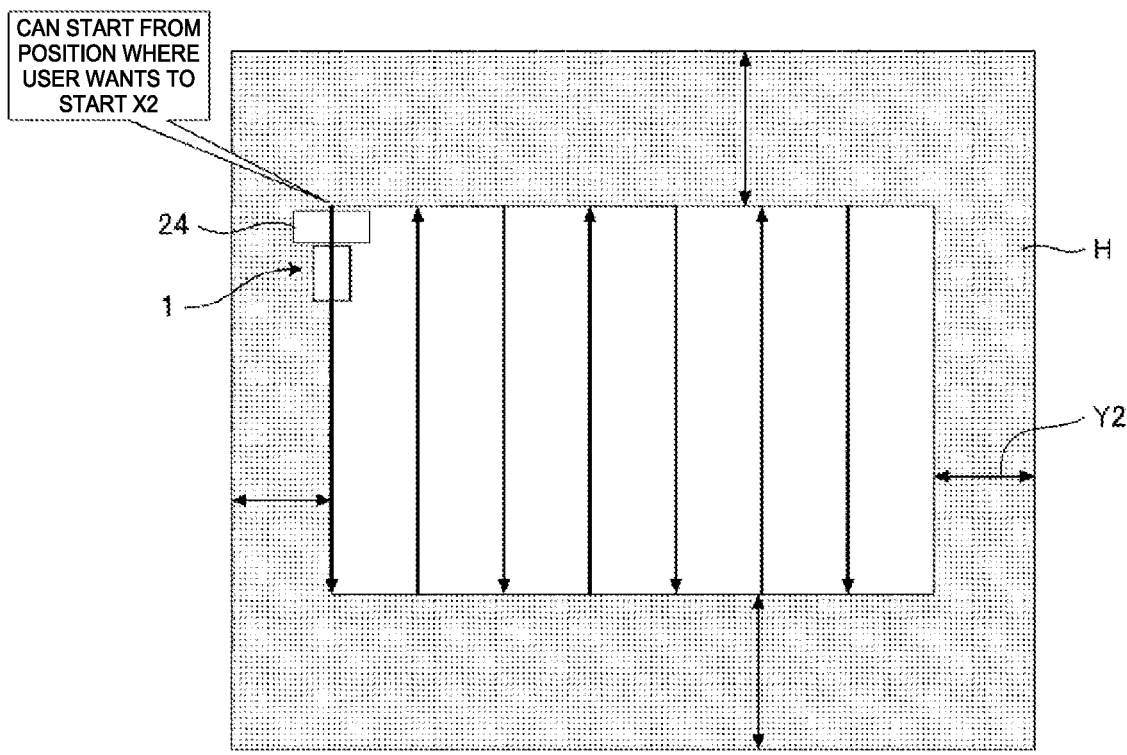
FIG. 11B is an explanatory diagram illustrating appropriateness of the set travel route in this embodiment.

On the other hand, if the operator determines that there is some problem with the work start position X or the like, he/she returns to the second Step SA2 and starts over again with the work done so far. Then, the operator can cause the setting screen for the headland area width to be displayed by touching the selection switch S4 on the menu screen, for example, and execute setting and registration again by inputting the number of work strokes and numerical values for the headland area width again. FIG. 11B illustrates the work route R and the work start position X2 after the re-setting. In this way, by performing the aforementioned work again, the operator can change the work start position to the one he/she desires.

Note that, if the fourth mode is not selected at the second Step SA2, the other modes described below are selected and the work is performed in that mode (sixth Step SA6).

Second Example

Figure 12:
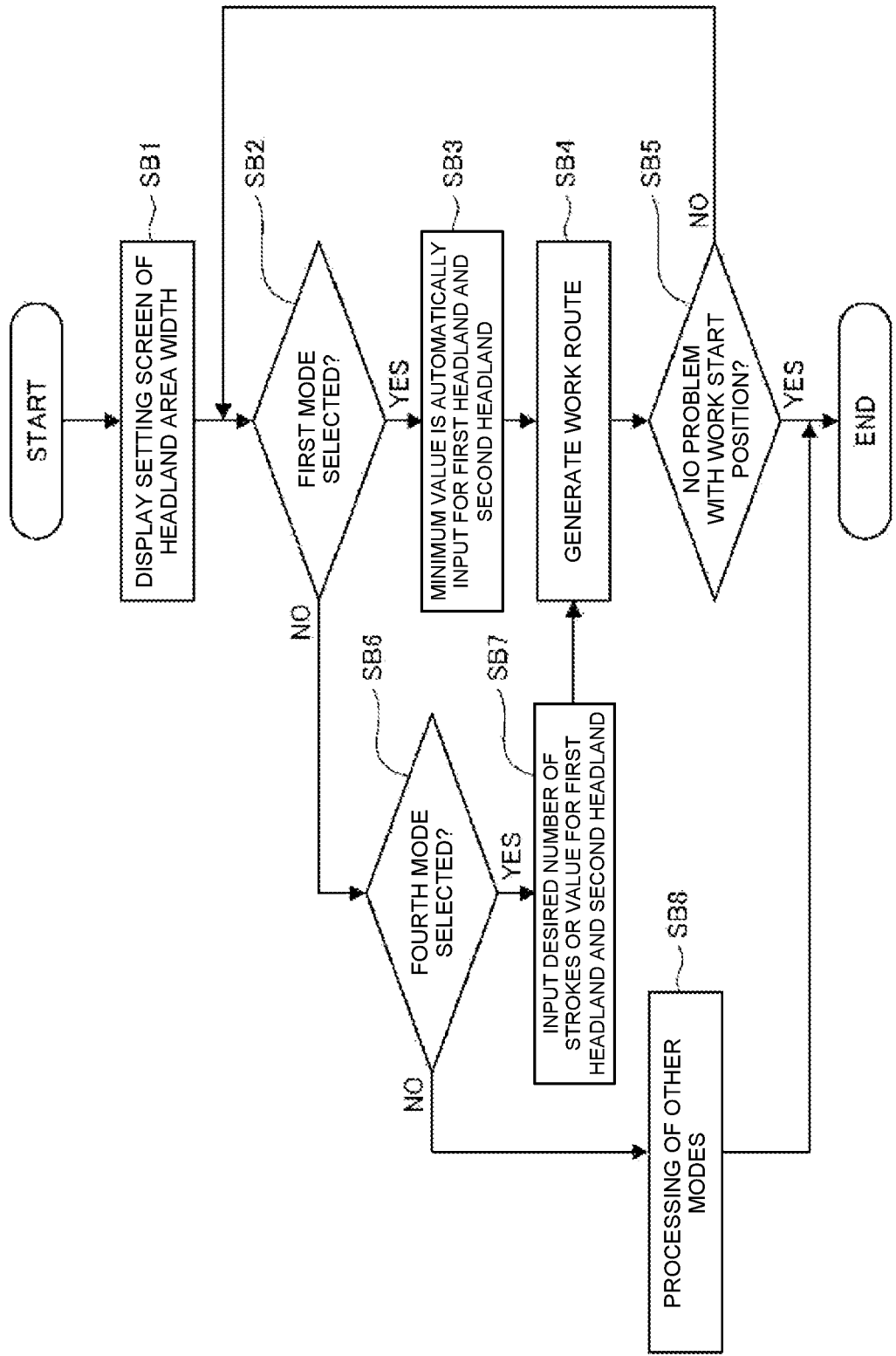
FIG. 12 is a flowchart of first another example illustrating an operation example at the changing work of the headland width and the like in the changing unit according to the first embodiment of the present invention.

Subsequently, another area registration system of the present invention (hereinafter referred to as a "second example" in some cases) will be described specifically with reference to FIG. 12 and the like.

Note that, in this second example, unlike the first example, a case where the headland width value automatically set by any of the first mode to the third mode shown in FIG. 9 is changed again to an arbitrary numerical value by the operator will be described.

Note that, in the second example, too, as in the first example, the following items, that is, the information relating to the field such as the work width W, the minimum turning radius of the tractor 1 and the like (sizes, shapes and the like, for example), the work start position X of the travel route R (see FIG. 8) and the like are assumed to be already stored/registered in the storage unit 103 in advance.

First, the menu page for specifying the headland width, that is, the screen of the display 102 as shown in FIG. 9, is displayed (first Step SB1), and if the first mode is selected among the first mode to the third mode (second Step SB2), the screen shifts to the third Step SB3.

For example, if the operator selects the first mode in which the first headland area and the second headland area are set to the minimum values among the first mode to the third mode, the values of the respective headland areas are automatically input (third Step SB3). Note that, in this case, as shown in FIG. 11A, the width of the first headland area including the turn is determined by the turning width in which the work vehicle can turn and a safety margin (approximately 1 m). In addition, the width of the second headland area not including the turn is determined by the width required for the work vehicle to travel and the safety margin (approximately 1 m).

Subsequently, the target travel route R is generated by the automatically input widths of the first headland area and the second headland area (fourth Step SB4). Subsequently, it is determined whether or not the work start position X is set to the position desired by the operator in the target travel route R (fifth Step SB5).

And if the work start position X is set to the position desired by the operator, the work route generation work can be finished here, but if the work start position X and the like are not set to the desired position, the processing returns to the second Step SB2. The operator can then change the widths of the first headland area and the second headland area on the screen shown in FIG. 9 when any of the first mode to the third mode is selected.

After the operator sets the widths of the first headland area and the second headland area, the screen shifts to the work setting screen where the vehicle speed during the work and the vehicle speed at a turn are set by operating the forward tab T1 in FIG. 9, similarly to Example 1. Then, after final confirmation of setting items, the target travel route R is generated.

On the other hand, if it is determined to be NO at the second Step SB2, that is, if the operator does not want to select any of the first mode to the third mode but wants to set the width of the headland area in the fourth mode, then the processing shifts to the sixth Step SB6. In this case, the operator can arbitrarily input the values for the widths of the first headland area and the second headland area. For example, the operator specifies and inputs the number of work strokes in the second headland area as 2 and the number of work strokes in the first headland area as 4, here. Then, if the operator wants to select the fourth mode, he/she touches the selection switch S4 (seventh Step SB7).

Here, the same operation as that in the first example can be performed. On the other hand, if a mode other than the first mode and the fourth mode, that is, the second mode or the third mode is selected at the sixth Step SB6, the processing shifts to a processing work in the other modes (eighth Step SB8).

Third Example

Figure 13:
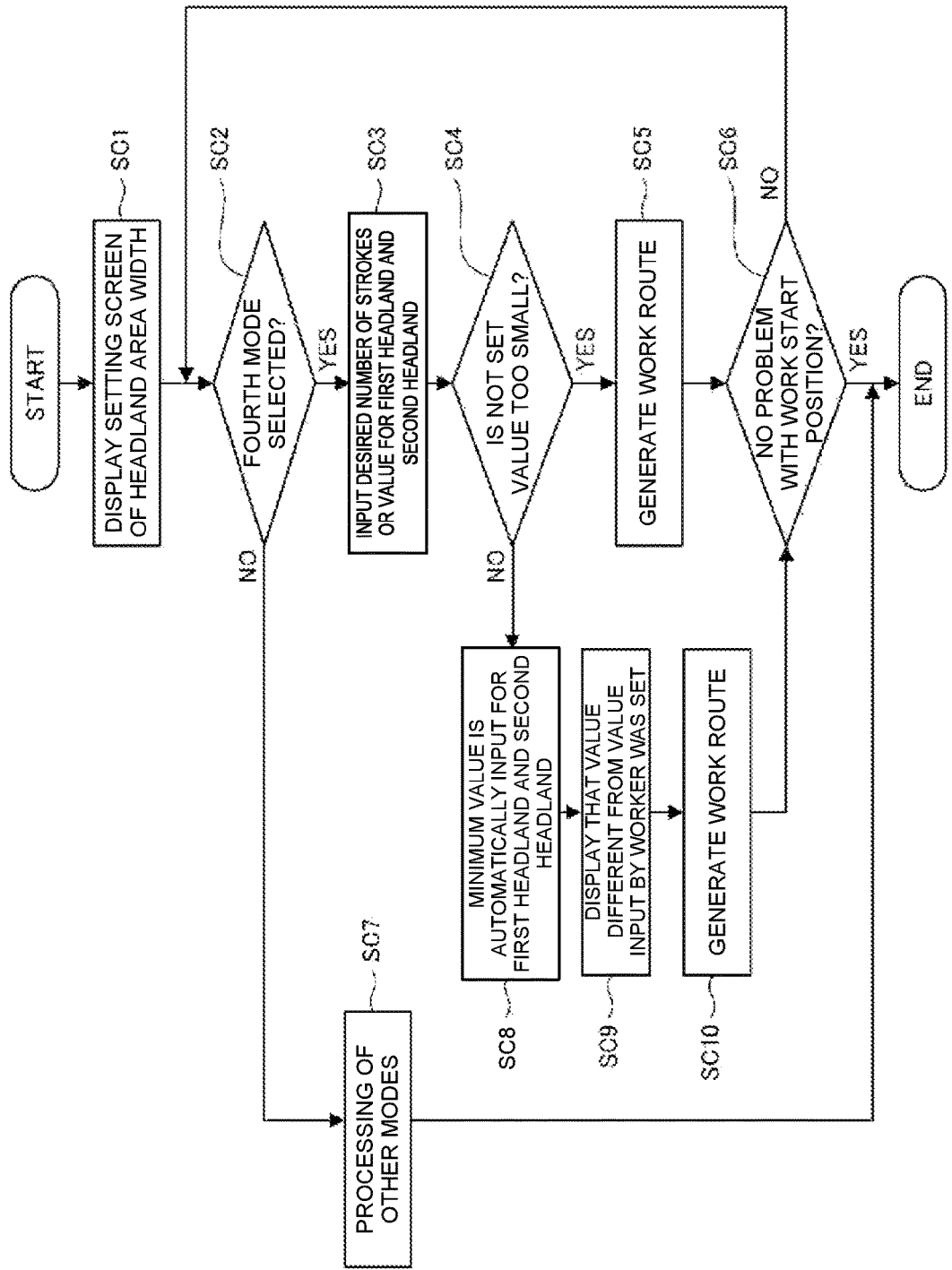
FIG. 13 is a flowchart of first another example (when the set value is too small) illustrating an operation example at the changing work of the headland width and the like in the changing unit according to the first embodiment of the present invention.
Figure 14:
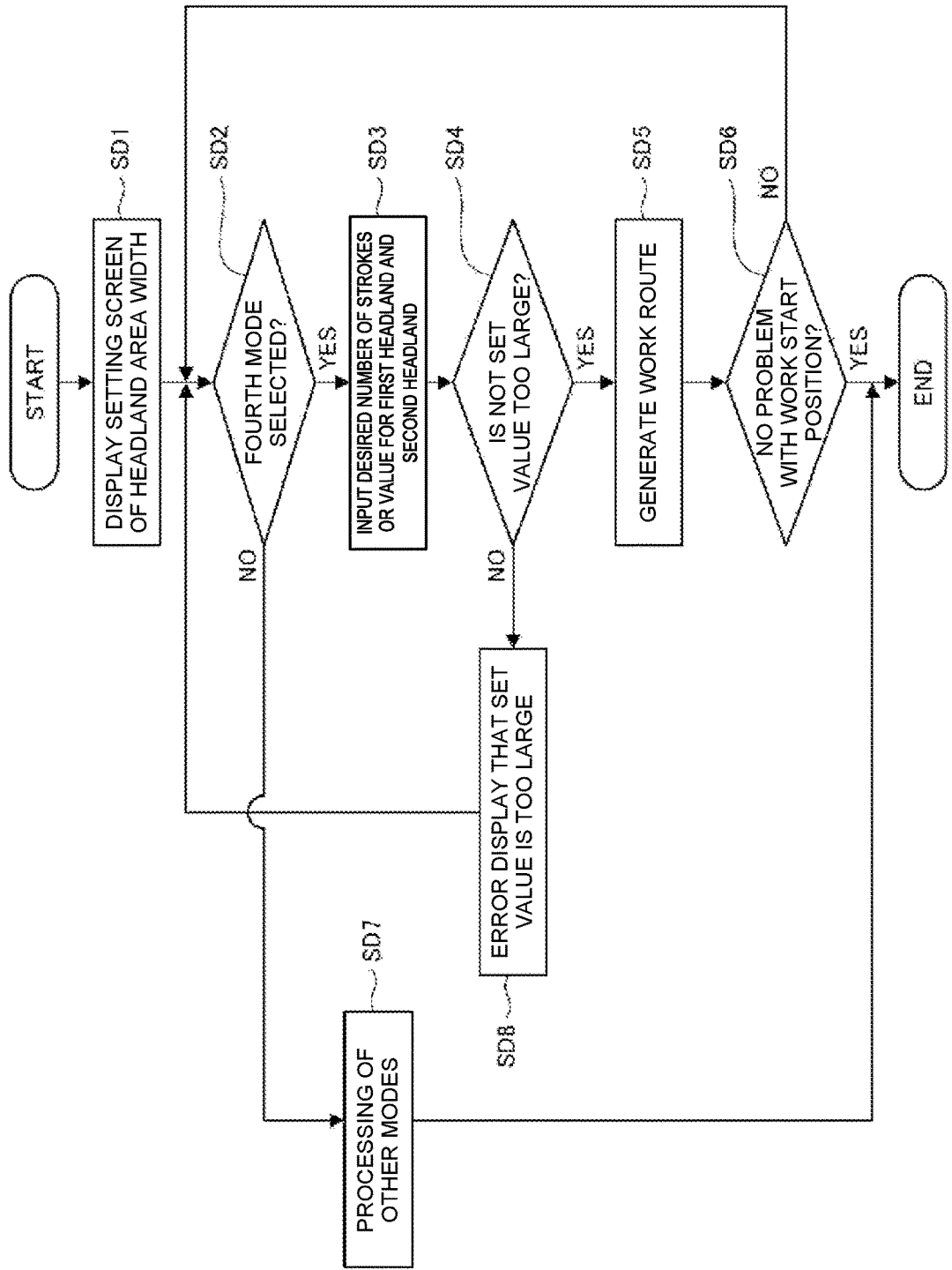
FIG. 14 is a flowchart of first another example (when the set value is too large) illustrating an operation example at the changing work of the headland width and the like in the changing unit according to the first embodiment of the present invention.

Subsequently, another area registration system of the present invention (hereinafter referred to as a "third example") will be described specifically with reference to FIG. 13, FIG. 14 and the like.

Note that, in this third example, unlike the first and second examples, in the control unit 105 of the remote control device 100, a case in which the number of work strokes or the numerical value of the width for the headland width set and registered by the operator does not reach the numerical value set in advance and a case of exceeding that will be described.

In the third example, too, as in the first and second examples, the following items, that is, the information relating to the field such as the work width W, the minimum turning radius of the tractor 1 and the like (sizes, shapes and the like, for example), the work start position X of the travel route R (see FIG. 8) and the like are assumed to be already stored/registered in advance in the storage unit 103.

Here, the case in which the specified value has not reached the numerical value set in advance will be described by using FIG. 13. First, a menu page to allow input of the desired numerical value for the number of work strokes, that is, the screen as shown in FIG. 9 is displayed on the display 102 (first Step SC1). Then, it is determined whether or not the fourth mode is to be set (second Step SC2). For that purpose, the operator touches the selection switch S4 with a finger or the like. As a result, such a state is brought about that the number of the strokes or the numerical values of the headland widths in the first headland area and the second headland area can be input on the screen.

Subsequently, the operator numerically inputs the desired number of work strokes or the numerical values of the headland widths for the second headland area and the first headland area (third Step SC3).

For example, suppose that the work width is 2 m, an input of two strokes is made for the first headland area, and an input of four strokes is made for the second headland area.

Here, the route generation unit 105A and the control unit 105 of the remote control device 100 (tablet) determines whether the set number of work strokes (or a value) is too small (whether it falls below the limit value or not) (fourth Step SC4). If the number of work strokes is larger than or equal to the limit value, the processing shifts to the fifth Step SC5.

Then, the work route R is generated in accordance with the set number of work strokes (fifth Step SC5).

Then, the operator determines whether or not there is any problem with the work start position X in the generated work route R (sixth Step SC6). If it is determined here that there is no problem with the work start position X or the like, the area registration work is finished.

On the other hand, if it is determined that there is a problem (in the case of NO) in SC6, that is, if the operator wants to change the set values of the first headland area and the second headland area, the processing returns to the second Step SC2. As a result, when the fourth mode is set again, the operator can input a numerical value for the number of work strokes or the headland width. On the other hand, if the operator does not want to change the set values, the target travel route R is generated after the work setting screen and setting items are confirmed, as in the first example.

Note that, if the fourth mode is not desired to be set in the second Step SC2, the processing shifts to the seventh Step SC7. Then, in this seventh Step SC7, the processing work in other modes is executed until the work processing is completed.

In addition, regarding the value of the headland width, if the set value (the number of work strokes, for example) is below the limit value in the fourth Step SC4, the minimum widths of the first headland area and the second headland area are automatically input/set (eighth Step SC8). In other words, if the first headland area can only be traveled with three strokes or more, three strokes (6 m in the value of the headland width), which is the minimum value, is set. That is, a value different from the input value specified by the operator is set.

In this case, a screen notifying the operator that the value specified by the operator was not set is displayed (ninth Step SC9).

In the next tenth Step SC10, a work route is generated in the same way as in the first and second examples described above (tenth Step SC10).

After that work route is generated, the processing shifts to the sixth Step SC6, and the same work is repeated.

In addition, when the work similar to the aforementioned flow of procedural processing is performed, in the fourth Step SC4 above, the case where the set value is not too small but too large (regarding the determination on whether or not the preset upper limit value is exceeded) will be explained with reference to FIG. 14. Note that, in this case, from the first Step SD1 to the third Step SD3, there is practically no difference in contents in those from the first Step SC1 to the third Step SC3 in the third example shown in FIG. 13 and thus, explanation till that is omitted and started at the fourth Step SD4.

In the fourth Step SD4, it is determined whether or not the specified value exceeds a preset threshold value (fourth Step SD4). Then, if the preset threshold value is not exceeded, the same processing as the fifth and sixth Steps SC5 and SC6 shown in FIG. 13 is executed, and the predetermined work route and the like are set and registered.

On the other hand, in the fourth Step SD4, if the value set is too large (the threshold value is exceeded), the processing shifts to the eighth Step SD8. The remote control device (tablet) 100 then displays a message that the set value is too large. That is, suppose that the work width is 2 m, and 50 strokes are input as the number of work strokes for the first headland area and the second headland area, respectively, for example. If the work area becomes smaller due to the number of work strokes, and a travel route cannot be generated, an error is displayed on the screen. This display may be alerted by a pop-up and the like on the screen, for example.

Note that, in this case, since the processing shifts to the second mode SD2, the operator can input the numerical value again by selecting and setting the fourth mode.

Also, in the second mode SD2, if the fourth mode is not to be selected, by shifting to the seventh Step SD7 and setting another desired mode, the processing there can be executed until it is finished.

Thereafter, when the operator changes the set values of the widths of the first headland area and the second headland area, the target travel route R is generated after confirmation of the work setting screen and the setting items, as in Example 1.

As described above, according to this embodiment, by accessing the changing unit 101D (and operating the changing unit 101D) via the selection switch S4, the operator can change and register the headland area (indirectly, the work area) set once (or specified by the operator himself/herself) to a desired value. In other words, the operator can change (or re-set) the setting by reviewing the sizes of the headland area and the work area by the changing unit 101D through the operation of the selection switch S4.

That is, on the conventional travel route setting screen, only such setting that the first headland width and the second headland width automatically become the minimum numbers of work strokes could be made, respectively, by control of the control unit. On the other hand, in this configuration, the operator can freely change the sizes of the headland area and the work area that have been set, for example, by inputting the desired values by the changing unit 101D through the headland area setting unit 101C by operating the selection switch S4 that constitutes the interface and the like. As a result, a travel route that matches the work start position desired by the operator can be generated. This makes it possible to change the travel route to the one that takes into account not only the work area but also the number of work strokes in the headland area and to set it.

First Another Embodiment

Figure 15:
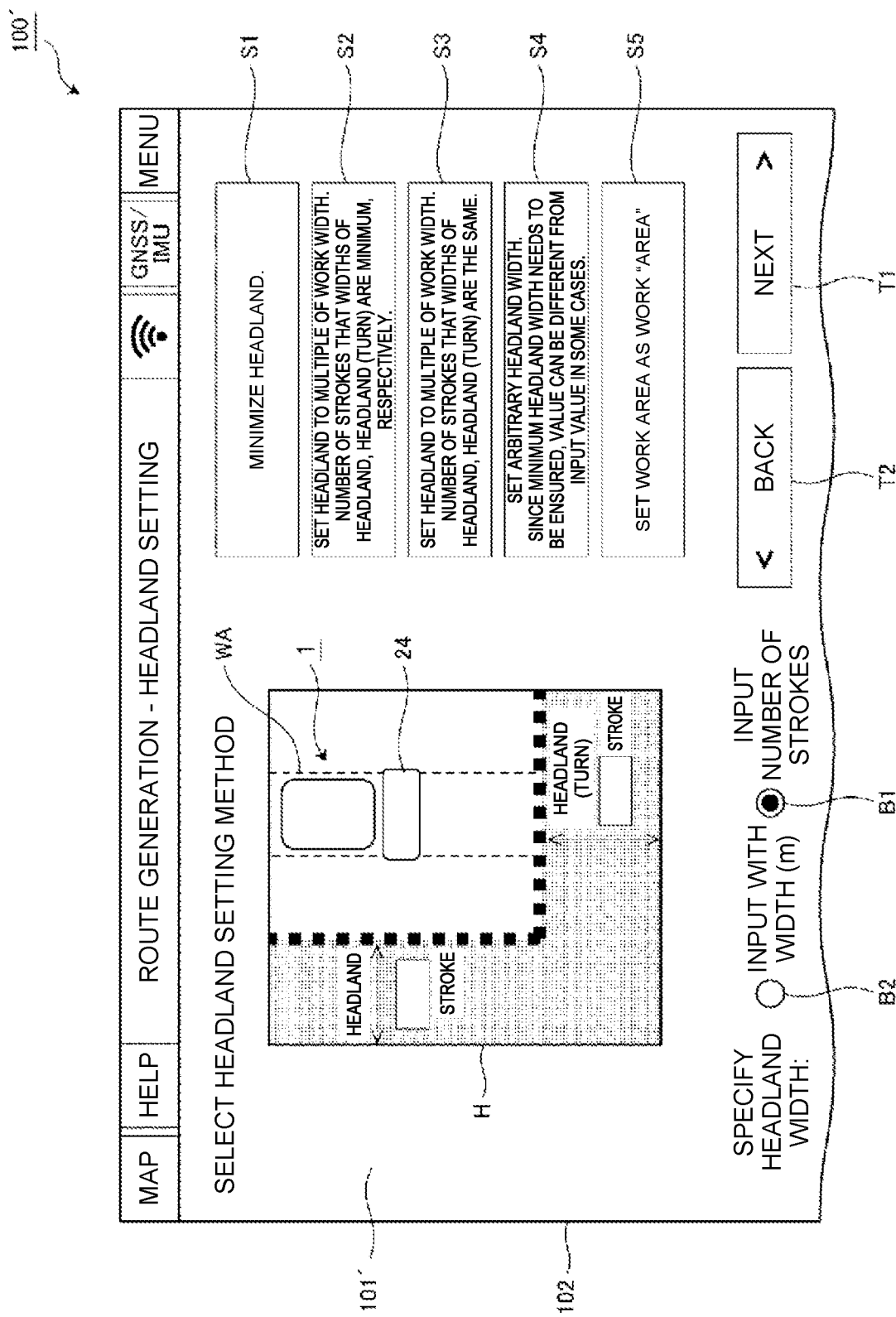
FIG. 15 is an explanatory diagram illustrating the operation screen at the changing work in the changing unit of first another embodiment of the present invention.
Figure 16:
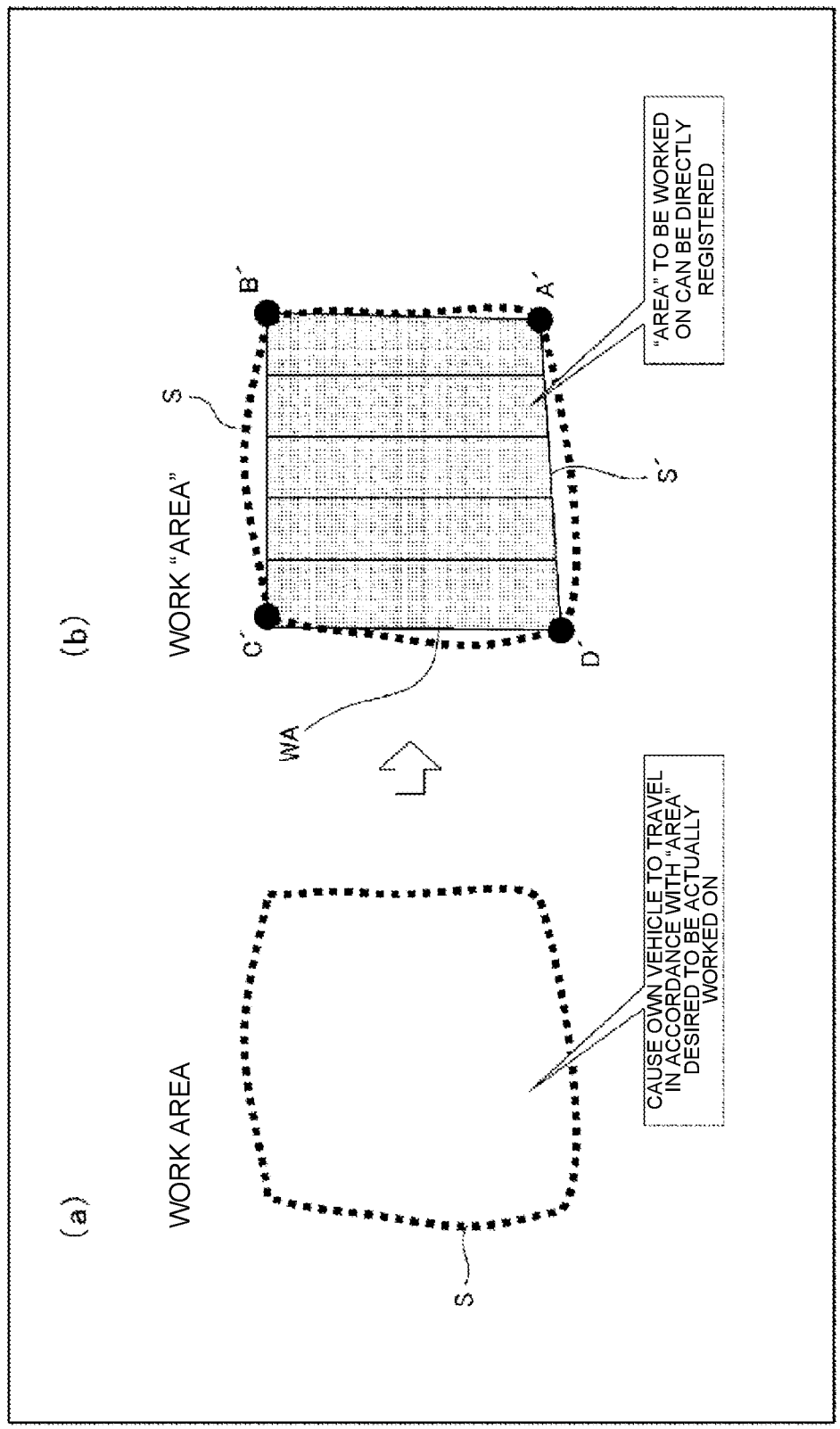
FIG. 16 is an explanatory diagram illustrating a setting method of a work "area" in first another embodiment of the present invention, in which (a) shows a travel locus of the autonomously traveling work vehicle and (b) is a diagram showing the work "area" that has been set.

Subsequently, the area registration system according to first another embodiment will be described in detail with reference to FIGS. 15 to 17.

In the aforementioned first embodiment, the work area is set by setting the width of the headland area and the number of work strokes, but in the first another embodiment, the work area is set before setting the size of the headland area. In the area registration system of the present invention shown in FIG. 15, a selection switch S5 for setting the work area is provided in addition to the selection switches S1 to S4 on an operation screen 101' displaying a menu for area registration on the display 102 of a remote control device 100' (see FIGS. 1 to 3).

This selection switch S5 is connected to the work area setting unit 101B of the remote control device 100', and in addition to the automatic setting of the work "area" HA by the control unit 105, the work area WA may be set, reviewed or changed via this work area setting unit 101B by an operation of this selection switch S5.

That is, prior to setting and changing of the headland width (or without setting or changing the headland width), the operator causes the tractor 1, which is a work vehicle, to travel in a desired area for which the operator wants to set and to register and sends the data on the travel locus to the work area setting unit 101B of the remote control device 100' via wireless communication so that the work area HA 100' can be set freely. Note that, by this setting and changing of the work area, the headland width is also changed.

Note that, in setting and registering of the work area WA, specifically, the travel locus may be registered as the work area WA by using the straight line mode of automatic travel for the tractor 1 which self-travels, for example. Alternatively, while traveling along a boundary of the desired work area WA by manual travel (see FIG. 16(a)), each point of an area constituting a boundary part of the work area WA, which is the desired cultivating area (in FIG. 16(b), for example, four corners A', B', C', and D' in a case of a square or each vertex in a case of a pentagon or other polygons) is registered as points. As a result, the desired work area can be formed and set and registered by connecting these points with straight lines.

In other words, in a forming work of the work area WA at this time, by tracing each of the points A' to D' displayed on the touch panel 101, which is a display screen of the display 102 (displayed in an inside area S of the field shown in FIG. 16(b), for example), obtained by actual travel of the tractor 1 (see FIG. 16(a)) by a touch pen or the like, not shown, while visually checking it, an outer profile S' of the work area can be geometrically formed. This makes it possible to set the work area WA of a substantial square (slightly closer to a trapezoid, to be strict) as shown in FIG. 17 easily. Therefore, this work area WA may be registered as the "work "area" HA" in the storage unit 103 via the work area setting unit 101B of the remote control device 100.

In addition to this, without actually causing the tractor 1 to travel, by operating the selection switch S5 to a selectively set work area input mode, the desired work area WA can be registered by the operator by free geometrical input on the screen.

After the registration of the work area WA, by causing the tractor 1 to actually travel around an outer perimeter of the work area WA as shown in FIG. 17, whether it can safely travel is checked. As a result, when travel safety is confirmed, this work area WA is set and registered as the work "area" HA. In addition, here, the work route (or the travel route R) as indicated by a solid line in FIG. 17 can be displayed on the screen of the display 102 by the route generation unit 105A.

In this way, the work area HA can be set without setting or changing the headland width. This makes it possible to reduce the number of processes involved in setting of the work area HA, and the work can be performed efficiently.

Second Embodiment

Subsequently, a second embodiment will be described with reference to FIG. 18.

In the aforementioned first another embodiment, the work area is set by traveling on an outline of an area to be a work area, but in a second embodiment, the work area is set from a travel locus of linear travel. In the area registration system in the second embodiment, on the touch panel 101 of the display 102 in a remote control device 100'' (see FIG. 1 to FIG. 3), other than the selection switches S1 to S4, a selection switch S6 is additionally provided for setting a work area.

Figure 18:
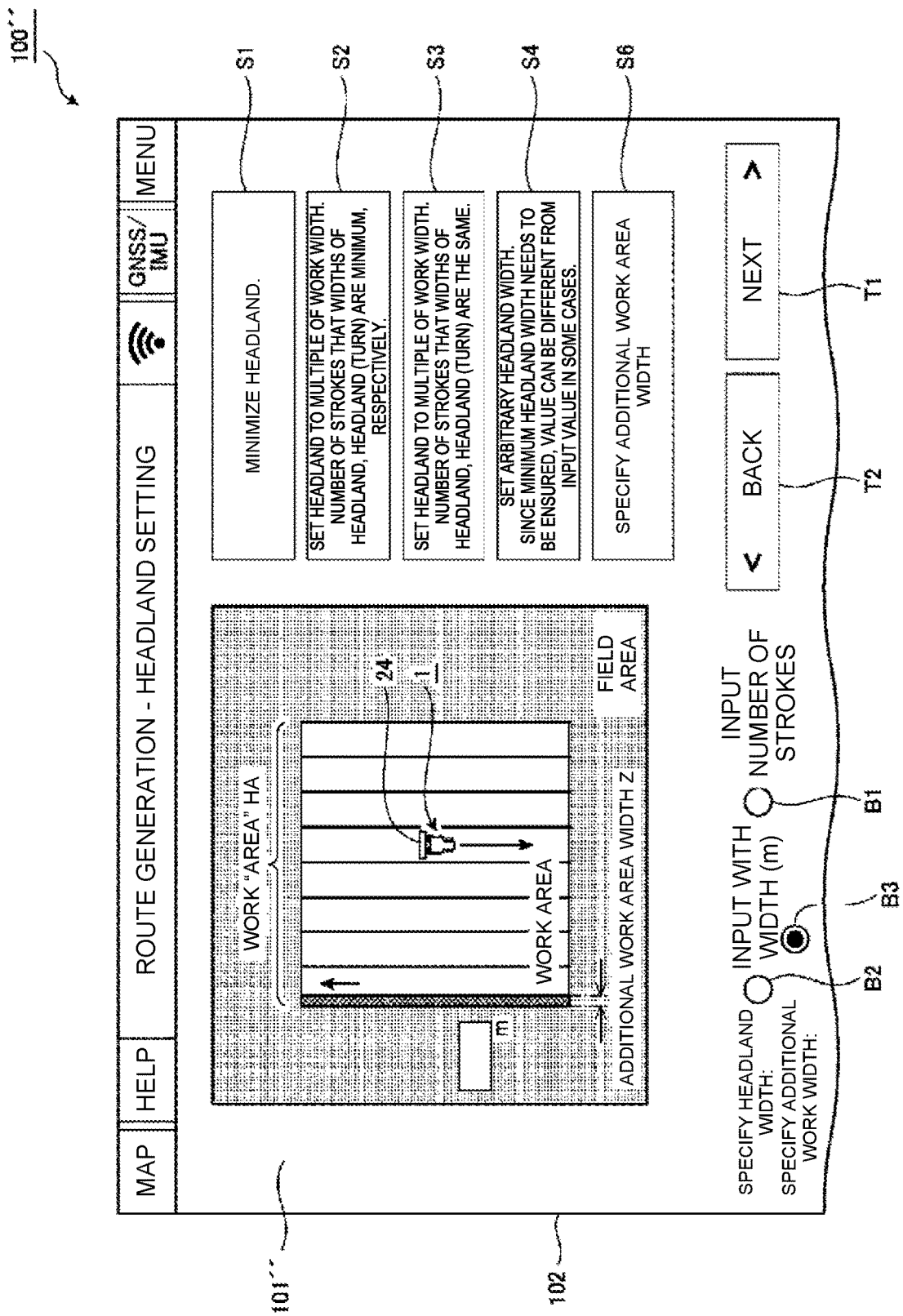
FIG. 18 is an explanatory diagram illustrating the operation screen at the changing work of the work area in the changing unit of a second embodiment of the present invention.

By touching this selection switch S6 by a finger or the like, an operation screen 101" shown in FIG. 18 that displays a menu for registering the work area via the work area setting unit 101B is displayed. There, the work area WA is formed automatically in advance.

Also in the second embodiment, it is configured such that the tractor 1 is first actually made to travel, and the work area WA is formed and registered from data on the work width and the number of work strokes on the basis of the linear travel locus actually traveled. However, a difference from the first another embodiment is that, in the first another embodiment, the tractor 1 is made to travel along the outline of the work area WA, while in the second embodiment, the work area WA is registered only from the linear travel locus. In other words, the work area WA can be registered on the basis of the linear travel locus, the work width set and registered in advance and the number of work strokes.

This makes it possible to set and to register two work areas WA in the field area. For example, different crops can be grown in respective work areas WA in a large field, which is practically convenient.

Addendum of the Invention

A first feature configuration of the present invention is including a vehicle information setting unit that sets information on a work vehicle autonomously traveling in a travel area, a work area setting unit that sets a work area in which the work vehicle performs a work, a headland area setting unit that sets a headland area constituted by a headland area including a turn and/or a headland area not including a turn, which is disposed on an outer side the work area and excludes the work area in the travel area on the basis of the information on the work vehicle, and a changing unit that can change setting of a size of both or either one of the headland area that includes a turn and the headland area that does not include a turn among the headland areas set by the headland area setting unit.

According to this configuration, the operator can change the headland area or the work area which was set once to a desired value by using the changing unit. In other words, the operator can change (or re-set) the setting by reviewing the sizes of the headland area and the work area.

That is, on the conventional travel route setting screen, only such setting that the width of the headland (headland width) and the width of the headland turn (turning headland width) become the minimum number of strokes could be made, respectively, but in this configuration, regarding the headland area which has been set, sizes of these areas can be freely changed by the operator by inputting a desired value by the changing unit. As a result, a travel route that matches the work start position desired by the operator can be generated. This makes it possible to change the travel route to the one that takes into account not only the work area but also the number of work strokes in the headland area and to set it.

A second feature configuration of the present invention is that the changing unit is configured to allow the operator to change the size of the headland area in accordance with the input value of the headland area width or the number of work strokes.

According to this configuration, as in the case of the second feature configuration, the size of the headland area (and the size of the work area) can be set and changed to a value desired by the operator.

A third feature configuration of the present invention is that the notification unit is provided for notifying that the value of the headland area width or the number of work strokes is not accepted when the work vehicle cannot make a turn in the headland area regarding the value of the headland area width or the number of work strokes which has been input.

According to this configuration, if, for example, the headland area width is too narrow, this situation can be notified to the operator that the value input by the operator is not accepted. This ensures that the operator can reliably grasp this situation without overlooking it. As a result, it is possible to have the setting changed to a safe headland area by changing the setting again, for example. In this way, a work vehicle such as a tractor can be safely caused to travel autonomously in a headland area that has been re-set to a safe size without deviating from the headland area.

A fourth feature configuration of the present invention is that the route generation unit that sets a travel route in the work area and the notification unit that notifies that a value of the headland area width or the number of strokes is not accepted, when the route generation unit cannot set a travel route in the work area for the value of the headland area width or the number of work strokes which has been input are provided.

According to this configuration, as in the third feature configuration, when the area settings in the work area are reviewed and changed according to a request of the operator, if an efficient and safe travel route is not set, this situation can be notified to the operator, for example. This makes it possible for the operator to reliably grasp the situation without overlooking it and to re-set a safe and efficient travel route, which is an effect that can be obtained.

A fifth feature configuration of the present invention is that the work start position setting unit for setting a position where the work vehicle starts a work is provided, and it is configured such that the set work start position can be changed by the operator when the size of the headland area is changed by the changing unit.

According to this configuration, the operator can change the size of the headland area to have a desired work start position.

A sixth feature configuration of the present invention is that the headland area can be set automatically, and it is configured such that the data having been already set automatically can be modified by the operator by inputting a predetermined value.

According to this configuration, the operator can modify not only data when the operator input, but also the data that is automatically input, which is convenient.

Note that, the area registration system of the present invention may be constituted by a system including the autonomously traveling work vehicle 1 and the remote control device 100 or may be constituted by the remote control device 100 alone. In other words, the remote control device 100 is an example of the area registration system of the present invention.

Note that the present invention is not limited to the aforementioned embodiments, but also includes configurations in which each configurations obtained by mutually substituting or changing a combination of each configuration disclosed in the above-mentioned embodiments and configurations obtained by mutually substituting or changing a combination of known inventions and each configuration disclosed in the aforementioned embodiments.

The technical scope of the present invention is not limited to the embodiments described above but extends to the matters described in the claims and their equivalents.

The invention claimed is:

1. An area registration method for a work vehicle to travel autonomously in a travel area, executing:
   setting information on the work vehicle that autonomously travels in the travel area;
   setting a work area that is included in the travel area and in which the work vehicle performs a work;
   setting a headland area that is included in the travel area and disposed on an outer side of the work area in which the work vehicle performs the work; and
   when an operation to input setting information of the headland area is accepted after the work area and the headland area have been set, changing sizes of the work area and the headland area on the basis of the input setting information on which the work vehicle uses to travel and work.

2. The area registration method according to claim 1, wherein
   when an operation to input a width of the headland area or a number of work strokes is accepted after the work area and the headland area have been set, a size of the headland area is changed in accordance with the width of the headland area or the number of work strokes which has been input, and the size of the work area is changed in accordance with the changed size of the headland area.

3. The area registration method according to claim 2, wherein
   when the work vehicle cannot make a turn in the headland area whose size was changed in accordance with the width of the headland area or the number of work strokes which has been input, notification is made that the width of the headland area or the number of work strokes which has been input is not accepted.

4. The area registration method according to claim 2, further comprising:
   setting a travel route in the work area; and
   it is notified that the width of the headland area or the number of work strokes which has been input is not accepted, when the travel route cannot be set in the work area whose size was changed in accordance with the width of the headland area or the number of work strokes which has been input.

5. The area registration method according to claim 1, further comprising:
   setting a work start position, which is a position at which the work vehicle starts a work in the work area; and
   the set work start position is changed when the sizes of the work area and the headland area are changed after the work start position was set.

6. The area registration method according to claim 1, wherein
   the headland area can be automatically set on the basis of a predetermined condition; and
   the automatically set headland area can be changed by inputting a width of the headland area or a number of work strokes.

7. The area registration method according to claim 1, wherein
   the headland area is set on the basis of the information of the work vehicle; and
   the work area is set on the basis of the setting information of the set headland area.

8. The area registration method according to claim 1, wherein
   the headland area includes a first headland area that includes a turn and a second headland area that does not include a turn; and
   a size of at least either one of the first headland area and the second headland area is changed on the basis of the input setting information.

9. An area registration system for a work vehicle to travel autonomously in a travel area, comprising:
   a vehicle information setting unit that sets information on a work vehicle that autonomously travels in a travel area;
   a work area setting unit that sets a work area included in the travel area and in which the work vehicle performs a work;
   a headland area setting unit that sets a headland area included in the travel area and disposed on an outer side of the work area in which the work vehicle performs the work; and
   a changing unit that changes the sizes of the work area and the headland area on the basis of the input setting information on which the work vehicle uses to travel and work, when an operation to input setting information of the headland area is accepted after the work area and the headland area have been set.

* * * * *